US012789524B2

(12) United States Patent
Takagi

(10) Patent No.: US 12,789,524 B2
(45) Date of Patent: Nov. 10, 2026

(54) LIQUID DISCHARGE HEAD SUBSTRATE, LIQUID DISCHARGE HEAD, AND LIQUID DISCHARGE APPARATUS

(71) Applicant: CANON KABUSHIKI KAISHA, Tokyo (JP)

(72) Inventor: Makoto Takagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 180 days.

(21) Appl. No.: 18/601,095

(22) Filed: Mar. 11, 2024

(65) Prior Publication Data

US 2024/0308209 A1 Sep. 19, 2024

(30) Foreign Application Priority Data

Mar. 13, 2023 (JP) ................................ 2023-038978

(51) Int. Cl.
*B41J 2/045* (2006.01)

(52) U.S. Cl.
CPC ....... *B41J 2/04573* (2013.01); *B41J 2/04541* (2013.01); *B41J 2/04543* (2013.01); *B41J 2/0455* (2013.01); *B41J 2/0458* (2013.01); *B41J 2/04581* (2013.01)

(58) Field of Classification Search
CPC .................................................... B41J 2/04573
See application file for complete search history.

(56) References Cited

U.S. PATENT DOCUMENTS

| | | | | |
|---|---|---|---|---|
| 6,062,666 | A * | 5/2000 | Omata | B41J 2/04581 347/42 |
| 9,272,508 | B2 | 3/2016 | Umeda et al. | |
| 9,688,067 | B2 | 6/2017 | Umeda et al. | |
| 2015/0062212 | A1 * | 3/2015 | Umeda | B41J 2/2132 347/9 |
| 2016/0121604 | A1 | 5/2016 | Umeda et al. | |

FOREIGN PATENT DOCUMENTS

| | | | |
|---|---|---|---|
| JP | 2015-63120 | A | 4/2015 |

* cited by examiner

*Primary Examiner* — Shelby L Fidler
(74) *Attorney, Agent, or Firm* — VENABLE LLP

(57) ABSTRACT

A liquid discharge head substrate including liquid discharge elements constituting an element array along a first direction and a delay circuit configured to generate delay signals obtained by delaying an enable signal for driving the liquid discharge elements by different delay amounts is provided. The delay circuit includes a first circuit configured to start supplying delay signals to first group elements of the liquid discharge elements sequentially in a forward direction in the first direction and a second circuit configured to start supplying delay signals to second group elements of the liquid discharge elements sequentially in a backward direction in the first direction. In the element array, not less than one element included in the first group elements and not less than one element included in the second group elements are alternately arranged.

18 Claims, 15 Drawing Sheets

LIQUID DISCHARGE HEAD SUBSTRATE, LIQUID DISCHARGE HEAD, AND LIQUID DISCHARGE APPARATUS

BACKGROUND OF THE INVENTION

Field of the Invention

The present invention relates to a liquid discharge head substrate, a liquid discharge head, and a liquid discharge apparatus.

Description of the Related Art

In a liquid discharge head substrate, when a plurality of liquid discharge elements are simultaneously driven, a large current flows through the power line and the ground line. Electromagnetic noise may be caused by inductive coupling between the power line and the ground line at a rising edge and a falling edge of this large current, and a logic circuit arranged on the liquid discharge head substrate may malfunction. According to Japanese Patent Laid-Open No. 2015-063120, in order to reduce electromagnetic noise, the timing of an enable signal for driving each liquid discharge element is delayed for each liquid discharge element to reduce a change in current per unit time. In addition, when a large current flows through the power line and the ground line, ringing occurs due to parasitic inductance. This causes fluctuations in the driving voltage of each liquid discharge element and a deterioration in the quality of image printing. Japanese Patent Laid-Open No. 2015-063120 discloses a technique of suppressing the influence of ringing by switching the driving order of a plurality of liquid discharge elements for each line time for printing an image corresponding to one line.

SUMMARY OF THE INVENTION

Reducing electromagnetic noise and suppressing the influence of ringing is important to improve the quality of image printing in a liquid discharge apparatus using a liquid discharge head substrate.

Some embodiments of the present invention provide a technique advantageous in reducing electromagnetic noise and suppressing the influence of ringing.

According to some embodiments, a liquid discharge head substrate comprising: a plurality of liquid discharge elements constituting an element array along a first direction; and a delay circuit configured to generate a plurality of delay signals obtained by delaying an enable signal for driving the plurality of liquid discharge elements by different delay amounts, wherein the delay circuit includes a first circuit configured to start supplying delay signals selected from the plurality of delay signals to liquid discharge elements, of the plurality of liquid discharge elements, which are included in a first liquid discharge element group sequentially in a forward direction in the first direction and a second circuit configured to start supplying delay signals selected from the plurality of delay signals to liquid discharge elements, of the plurality of liquid discharge elements, which are included in a second liquid discharge element group different from the first liquid discharge element group sequentially in a backward direction in the first direction, and in the element array, not less than one liquid discharge element of liquid discharge elements included in the first liquid discharge element group and not less than one liquid discharge element of liquid discharge elements included in the second liquid discharge element group are alternately arranged, is provided.

Further features of the present invention will become apparent from the following description of exemplary embodiments (with reference to the attached drawings).

DESCRIPTION OF THE EMBODIMENTS

Figure 1:
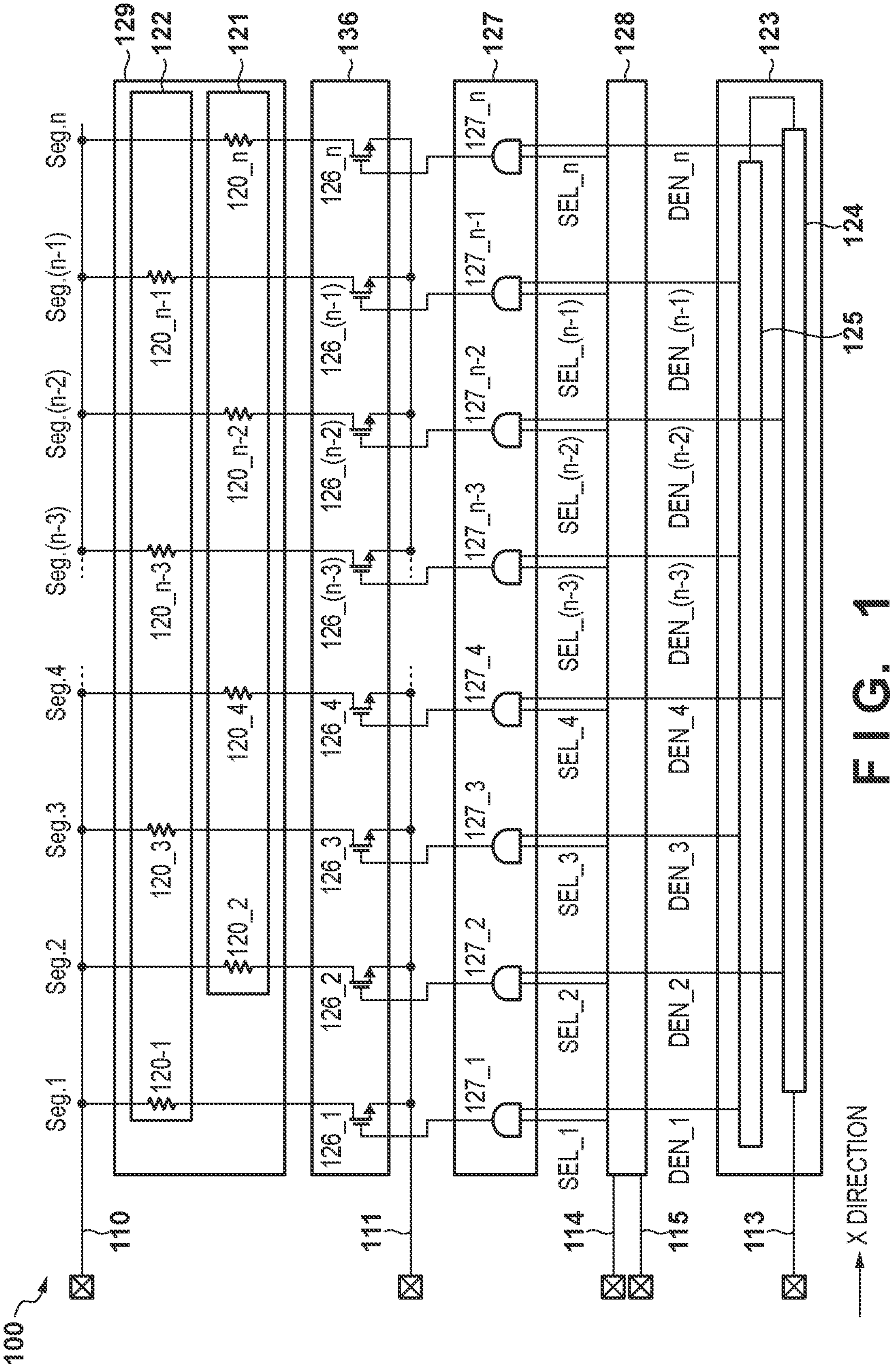
FIG. 1 is a circuit diagram showing an example of the arrangement of a liquid discharge head substrate according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A liquid discharge head substrate according to an embodiment of this disclosure will be described with reference to FIGS. 1 to 13. FIG. 1 is a circuit diagram showing an example of the arrangement of a liquid discharge head substrate 100 according to this embodiment. FIG. 1 shows resistors functioning as liquid discharge elements 120 in the liquid discharge head substrate 100 and a driving circuit that drives the liquid discharge elements 120.

The liquid discharge head substrate 100 includes the plurality of liquid discharge elements 120 constituting an element array 129 along the X direction (the lateral direction in FIG. 1) and a delay circuit 123 that generates a plurality of delay signals DEN by delaying an enable signal EN that drive the plurality of liquid discharge elements 120 by different delay amounts. The liquid discharge elements 120 may be various types of elements proposed in liquid discharge techniques. The liquid discharge element 120 may be a resistor that converts electric energy into thermal energy, a piezoelectric element that converts electric energy into mechanical energy, or the like. The delay circuit 123 is a circuit for delaying the enable signal EN indicating the driving timing of the liquid discharge element 120.

The liquid discharge head substrate 100 can further include a transistor group 136, a control gate circuit 127, and a memory circuit 128. Transistors 126 arranged in the transistor group 136 drive the liquid discharge elements 120. In this embodiment, NMOS transistors are used for the transistors 126. However, this is not exhaustive. For example, PMOS transistors may be used for the transistors 126. The control gate circuit 127 controls the gate voltages of the transistors 126 arranged in the transistor group 136. The memory circuit 128 is a circuit that holds the drive or non-drive information of each of the liquid discharge elements 120.

In the arrangement shown in FIG. 1, the liquid discharge head substrate 100 includes the n liquid discharge elements 120. A specific one of the liquid discharge elements 120 is indicated by a suffix like a liquid discharge element 120_1. The same applies to other constituent elements. In addition, a constituent element including a wiring pattern attached with the same suffix as that of the liquid discharge element 120 is used to drive the liquid discharge element 120.

The delay signal DEN obtained by delaying the enable signal EN as an output from the delay circuit 123 and a selection signal SEL as an output from the memory circuit 128 are supplied to the control gate circuit 127. Each control gate circuit **127_*m* (m is an integer of 1≤m≤n) drives the transistor 126** in accordance with a delay signal DEN_m (m is an integer of 1≤m≤n) and a selection signal SEL_m (m is an integer of 1≤m≤n).

The delay circuit 123 includes a circuit 124 that starts supplying the delay signals selected from the plurality of delay signals DEN to the liquid discharge elements 120, of the plurality of liquid discharge elements 120, which are included in a liquid discharge element group 121 sequentially in the forward direction (from left to right in FIG. 1) in the X direction and a circuit 125 that starts supplying the delay signals selected from the plurality of delay signals DEN to the liquid discharge elements 120, of the plurality of liquid discharge elements 120, which are included in a liquid discharge element group 122 different from the liquid discharge element group 121 sequentially in the backward direction (from right to left in FIG. 1) in the X direction. The circuit 124 and the circuit 125 which are arranged in the delay circuit 123 each can include a plurality of buffer circuits. The liquid discharge head substrate 100 is configured such that the plurality of buffer circuits have outputs to which corresponding liquid discharge elements of the plurality of liquid discharge elements 120 are respectively connected. The arrangement of the delay circuit 123 will be described later.

The enable signal EN is a signal for turning on the transistor 126 and is supplied from an external connection terminal to the delay circuit 123 via an EN signal line 113. The delay signal DEN_m (m is an integer of 1≤m≤n) is generated by the delay circuit 123 by delaying the enable signal EN.

The selection signal SEL corresponding to a data signal DATA supplied via a data signal line 115 is transferred to the memory circuit 128 in accordance with a clock signal (not shown). The selection signal SEL_m is saved in a memory circuit in the memory circuit 128 in accordance with the memory timing signal LT supplied by the memory timing signal line 114. The memory timing signal LT and the data signal DATA are supplied from outside of the liquid discharge head substrate 100 via an external connection terminal. The details of the memory circuit 128 will be described later.

The plurality of liquid discharge elements 120 are arranged between a common power line 110 and a ground line 111. The power line 110 is commonly connected to one end of each of the liquid discharge elements 120. The other end of each of the liquid discharge elements 120 is connected to the drain terminal of the transistor 126 using an NMOS transistor. The source terminals of the transistors 126 are commonly connected to the ground line 111. Appropriate potentials are respectively supplied to the power line 110 and the ground line 111 via external connection terminals.

Figure 2:
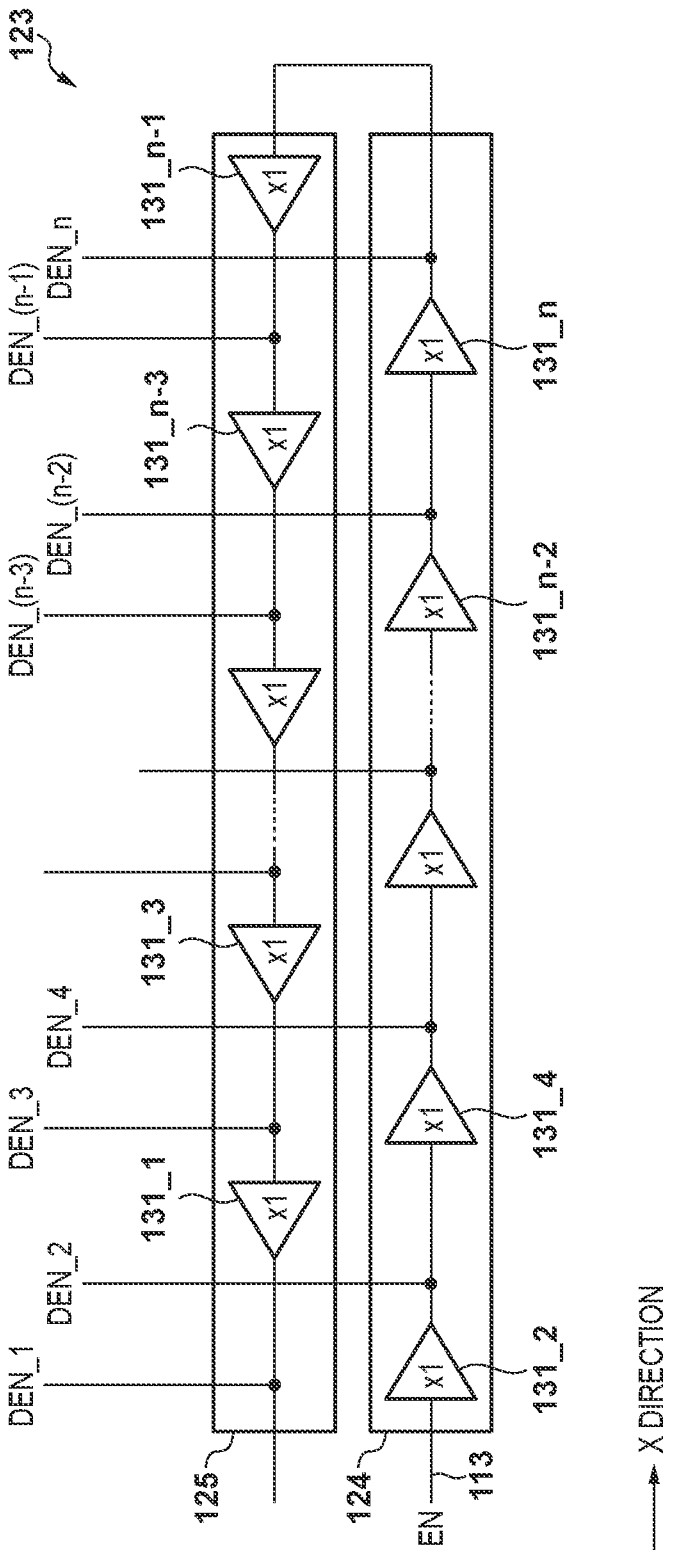
FIG. 2 is a block diagram showing an example of the arrangement of a delay circuit arranged on the liquid discharge head substrate in FIG. 1.

FIG. 2 is a block diagram showing an example of the arrangement of the delay circuit 123. As described above, the delay circuit 123 includes the circuit 124 and the circuit 125 each including a plurality of buffer circuits (delay buffers 131). Referring to FIG. 2, in the delay circuit 123, the circuit 124 and the circuit 125 are connected in series. More specifically, the output of delay buffer **131_*n* of the plurality of a last-stage delay buffers 131 arranged in the circuit 124 is input to the circuit 125**.

Upon receiving the input of the enable signal EN from the EN signal line 113, the circuit 124 generates and outputs delay signals DEN_(2×*p*) (p is an integer of 1≤p≤n/2) respectively delayed and differed in timing by the delay buffers 131 in ascending order from p=1. In addition, the delay signal DEN_n is input as an output from the circuit 124 to the circuit 125. Upon receiving the input to the delay signal DEN_n, the circuit 125 generates and outputs the delay signals DEN_(2×*p*−1) (p is an integer of 1≤p≤n/2) respectively differed in timing by the delay buffers 131 in descending order from p=n/2. An output from the circuit 124 determines the driving timing of the liquid discharge element 120 included in the liquid discharge element group 121. An output from the circuit 125 determines the driving timing of the liquid discharge element 120 included in the liquid discharge element group 122. In this manner, each of outputs from the plurality of delay buffers 131 is supplied to a corresponding one of the plurality of liquid discharge elements 120 via the control gate circuit 127 and the transistor 126 to determine the driving timing of each liquid discharge element 120.

Figure 3:
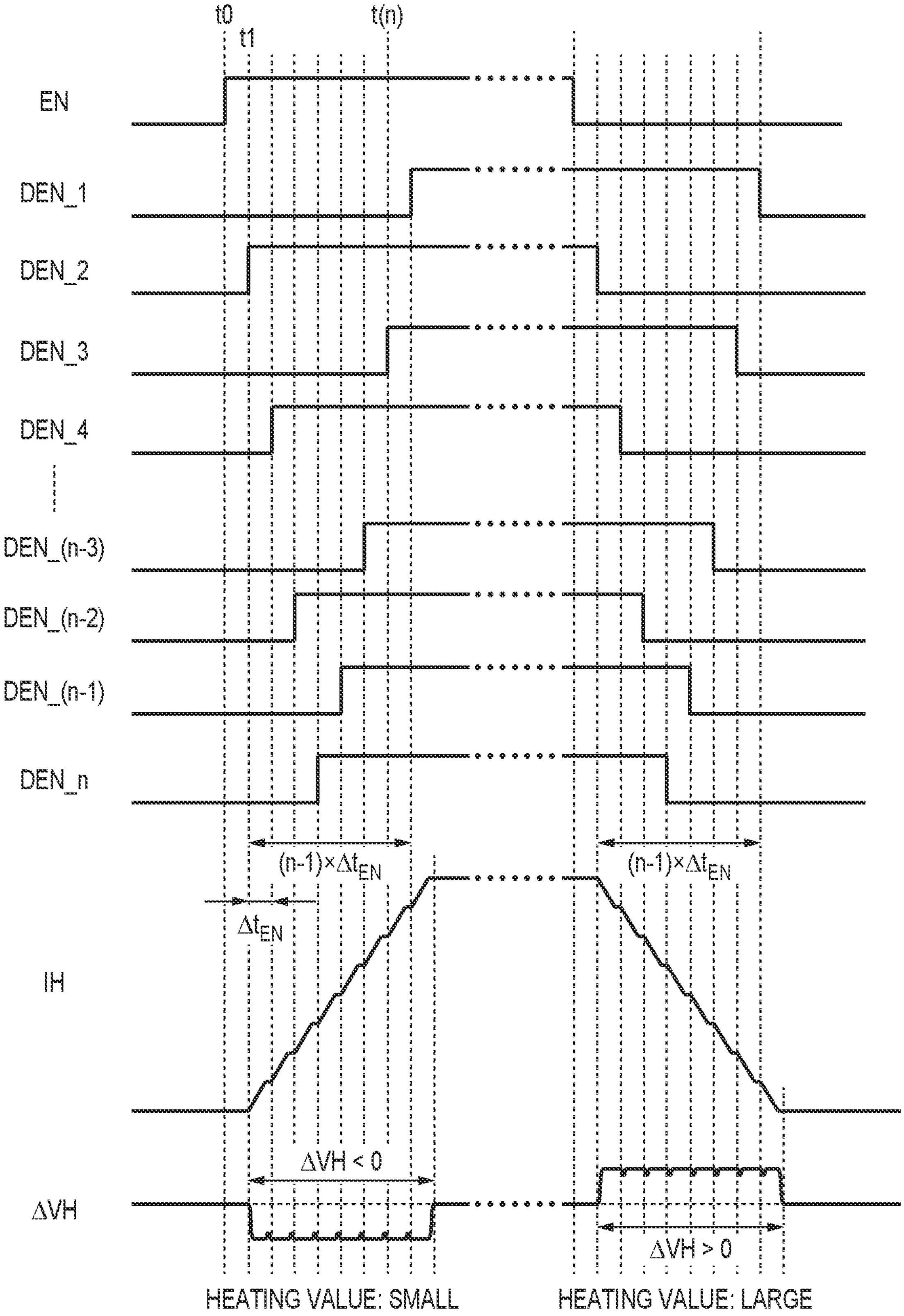
FIG. 3 is a timing chart showing the relationship among an enable signal supplied to the delay circuit in FIG. 2, delay signals, a current flowing through a power line, and a voltage.

FIG. 3 is a timing chart showing the enable signal EN, the delay signals DEN_m (m is an integer of 1≤m≤n) respectively supplied to the corresponding liquid discharge elements 120, a current amount IH flowing through the power line 110, and a change ΔVH in the potential of the power line 110. In this embodiment, the enable signal EN (the delay signal DEN) is a signal that drives the liquid discharge element 120 in a high-level period.

The circuit 124 generates the delay signals DEN_(2×*p*) (p is an integer of 1≤p≤n/2) by shifting each timing by a delay amount $\Delta t_{EN}$ of each delay buffer 131. Likewise, the circuit 125 generates the delay signals DEN_(2×*p*−1) (p is an integer of $1 \le p \le n/2$) by shifting each timing by the delay amount $\Delta t_{EN}$ of each delay buffer 131. The timing difference between a delay signal DEN_n and a delay signal DEN_(n−1) is also the delay amount $\Delta t_{EN}$. Time t(m) (m is an integer of $1 \le m \le n$) indicates the timing at which the delay circuit 123 outputs each delay signal DEN with reference to the timing (time t0) at which the enable signal EN is supplied to the delay circuit 123. Referring to FIG. 3, the timing differences between the respective delay signals DEN sequentially output each are time t(m)−time t(m−1)=delay amount $\Delta t_{EN}$.

In accordance with the delay signals DEN_m (m is an integer of $1 \le m \le n$), corresponding liquid discharge elements 120_*m* are started to be driven. When the liquid discharge elements 120 are sequentially driven with the timing difference of the delay amount $\Delta t_{EN}$, the current amount IH flowing through the power line 110 gradually increases. In this case, the temporal change in the current of the power line 110 is dIH/dt>0. As described above, in the delay circuit 123, the circuit 124 and the circuit 125 are connected in series. Accordingly, after the circuit 124 starts supplying the delay signals selected from the plurality of delay signals DEN to all the liquid discharge elements 120 included in the liquid discharge element group 121, the circuit 125 starts supplying the delay signals selected from the plurality of delay signals DEN to the liquid discharge elements 120 included in the liquid discharge element group 122. When a predetermined time has elapsed since the supply of the enable signal EN, as indicated on the right side of FIG. 3, the liquid discharge elements 120 are sequentially stopped being driven with the timing difference of the delay amount $\Delta t_{EN}$, and the current amount IH flowing through the power line 110 gradually decreases. In this case, the temporal change in the power supply current of each liquid discharge element is dIH/dt<0.

The liquid discharge element 120 provided on the liquid discharge head substrate 100 is driven to discharge a liquid by using the power supply for driving (the potential difference between the power line 110 and the ground line) and a control signal. In the liquid discharge head substrate 100 described above, the driving voltage applied to the liquid discharge element 120 influences energy to be generated. When the liquid discharge head substrate 100 is mounted on a liquid discharge head, the power supplied by using the power line 110 and the ground line 111 is supplied from a power supply circuit or capacitor via a long wiring pattern. In the liquid discharge head and the liquid discharge apparatus using the liquid discharge head, since a wire to input to the liquid discharge head substrate 100 mainly has a parasitic reactance component L in the power line 110, the voltage variation expressed by equation (1) given below occurs due to an increase/decrease in current.

$$\Delta VH = -L \times dIH/dt \tag{1}$$

Accordingly, as the number of liquid discharge elements 120 in the ON state gradually increases, a potential VH of the power line 110 decreases. In contrast to this, as the number of liquid discharge elements 120 in the ON state gradually decreases, the potential VH of the power line 110 increases. The current direction in the ground line 111 is opposite to that described above. Accordingly, as the number of liquid discharge elements 120 in the ON state gradually increases, a potential GNDH of the ground line 111 increases. As the number of liquid discharge elements 120 in the ON state gradually decreases, the potential GNDH of the ground line 111 decreases. The energy generated in the liquid discharge element 120 is proportional to the square of the potential difference (voltage) between the potential VH of the power line 110 and the potential GNDH of the ground line 111. For this reason, the time during which the potential of the power line 110 is low is relatively long with respect to the liquid discharge element 120 that is previously turned on as compared with the liquid discharge element 120 that is subsequently turned on. As a consequence, the energy generated in the liquid discharge element 120 decreases.

The energy applied to a droplet changes depending on the amount of energy generated at the liquid discharge element 120_*m* (m is an integer of $1 \le m \le n$), and hence the discharge droplet size changes depending on the discharge order of droplets. The energy applied to a droplet to be discharged first is relatively small, and hence the droplet is small. In contrast to this, the energy applied to a droplet to be discharged afterward is relatively large, and hence the droplet is large. The difference between the droplet sizes based on the liquid discharge order is, for example, about 3%.

Figure 4:
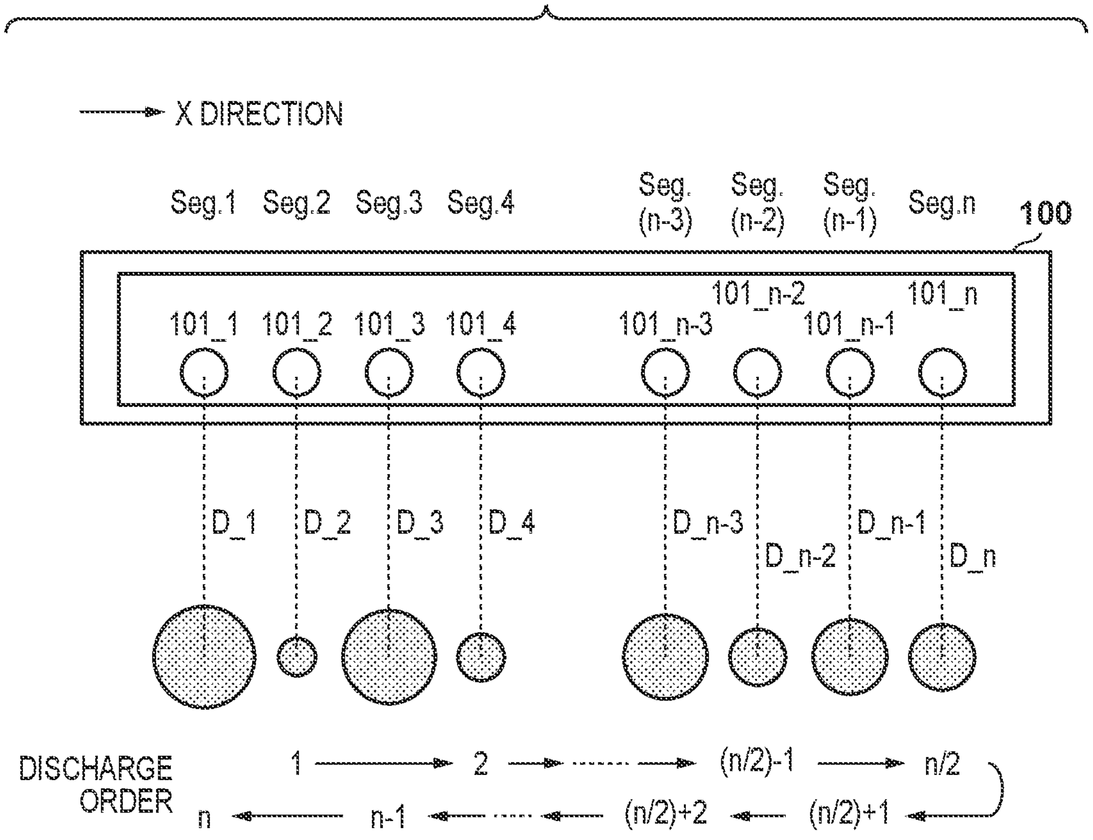
FIG. 4 is a view showing the order of discharging a liquid from the liquid discharge head substrate in FIG. 1 and the magnitude relationship among droplets.

FIG. 4 is a schematic view showing the placement of discharge ports 101 of the liquid discharge head using the liquid discharge head substrate 100, the discharge order of droplets to be discharged, and the magnitude relationship between droplets D attached to a print medium. Referring to FIG. 1, the liquid discharge elements 120 included in the liquid discharge element group 121 and the liquid discharge elements 120 included in the liquid discharge element group 122 are drawn shifted from each other in the up/down direction. This makes it easy to understand the liquid discharge element groups 121 and 122 in which the liquid discharge elements 120 are arranged. In practice, all the liquid discharge elements 120 may constitute the one element array 129 in the X direction, and the discharge ports 101 may be arranged in one array in the X direction, as shown in FIG. 4.

As shown in FIG. 4, the discharge ports 101 are provided in one-to-one correspondence with the liquid discharge elements 120_*m* (m is an integer of $1 \le m \le n$). The droplets heated by the liquid discharge elements 120_*m* are discharged toward a print medium. The discharge ports 101 are arranged side by side on the liquid discharge head substrate 100 in the X direction. As shown in FIG. 4, the liquid discharge head substrate 100 may be configured to have long sides in the X direction. The liquid discharge head forms a two-dimensional printed image on a print medium by continuously discharging droplets while shifting the print medium in a direction (for example, a vertical direction) crossing the X direction.

As shown in FIG. 4, droplets D_2*xp* are discharged from liquid discharge elements 120_2*xp* driven by the delay signals DEN_2*xp* generated by the circuit 124 in ascending order from p=1 (p is an integer of $1 \le p \le n/2$). Droplets D_2*xp*−1 are then discharged from liquid discharge elements 120_2*xp*−1 driven by delay signals DEN_2*xp*−1 generated by the circuit 125 in descending order from p=n/2 (p is an integer of $1 \le p \le n/2$).

In this embodiment, the liquid discharge elements 120 included in the liquid discharge element group 121 controlled by the circuit 124 and the liquid discharge elements 120 included in the liquid discharge element group 122 controlled by the circuit 125 are alternately arranged. As a result, small droplets D and large droplets D are alternately landed on a print medium. This can suppress the influence of ringing. In addition, all the liquid discharge elements 120 are not simultaneously driven, but each liquid discharge element 120 is driven with a timing shift corresponding to the delay amount $\Delta t_{EN}$. This reduces a change in current flowing through the power line 110 per unit time and hence can prevent the occurrence of electromagnetic noise accompanying changes in current in the power line 110 and the ground line 111. That is, it is possible to reduce electromagnetic noise and suppress the influence of ringing, thereby making it difficult to visually recognize a density change due to the droplet discharge order. In addition, in this embodiment, the droplet discharge order like that described above can be implemented by the delay circuit 123 in which the circuit 124 and the circuit 125, each including the plurality of delay buffers 131, are arranged. This eliminates the necessity of a switching circuit like that disclosed in Japanese Patent Laid-Open No. 2015-063120 and the necessity to generate signals for controlling the switching circuit. That is, it is possible to improve the quality of image printing by reducing electromagnetic noise and suppressing the influence of ringing while suppressing an increase in the circuit size of the liquid discharge head substrate 100 (the delay circuit 123).

According to the above description, in the element array 129, one of the liquid discharge elements 120 included in the liquid discharge element group 121 and one of the liquid discharge elements 120 included in the liquid discharge element group 122 are alternately arranged. However, this is not exhaustive. One or more liquid discharge elements of the liquid discharge elements 120 included in the liquid discharge element group 121 and one or more liquid discharge elements of the liquid discharge elements 120 included in the liquid discharge element group 122 may be alternatively arranged. A plurality of liquid discharge elements of the liquid discharge elements 120 included in the liquid discharge element group 121 and a plurality of liquid discharge elements of the liquid discharge elements 120 included in the liquid discharge element group 122 may be alternately arranged as long as it is difficult to visually recognize a density change due to the droplet discharge order. The number of the liquid discharge elements 120 included in the liquid discharge element group 121 and the number of the liquid discharge elements 120 included in the liquid discharge element group 122 which are alternately arranged may be five or less, 10 or less, 20 or less, or 50 or less.

Figure 5:
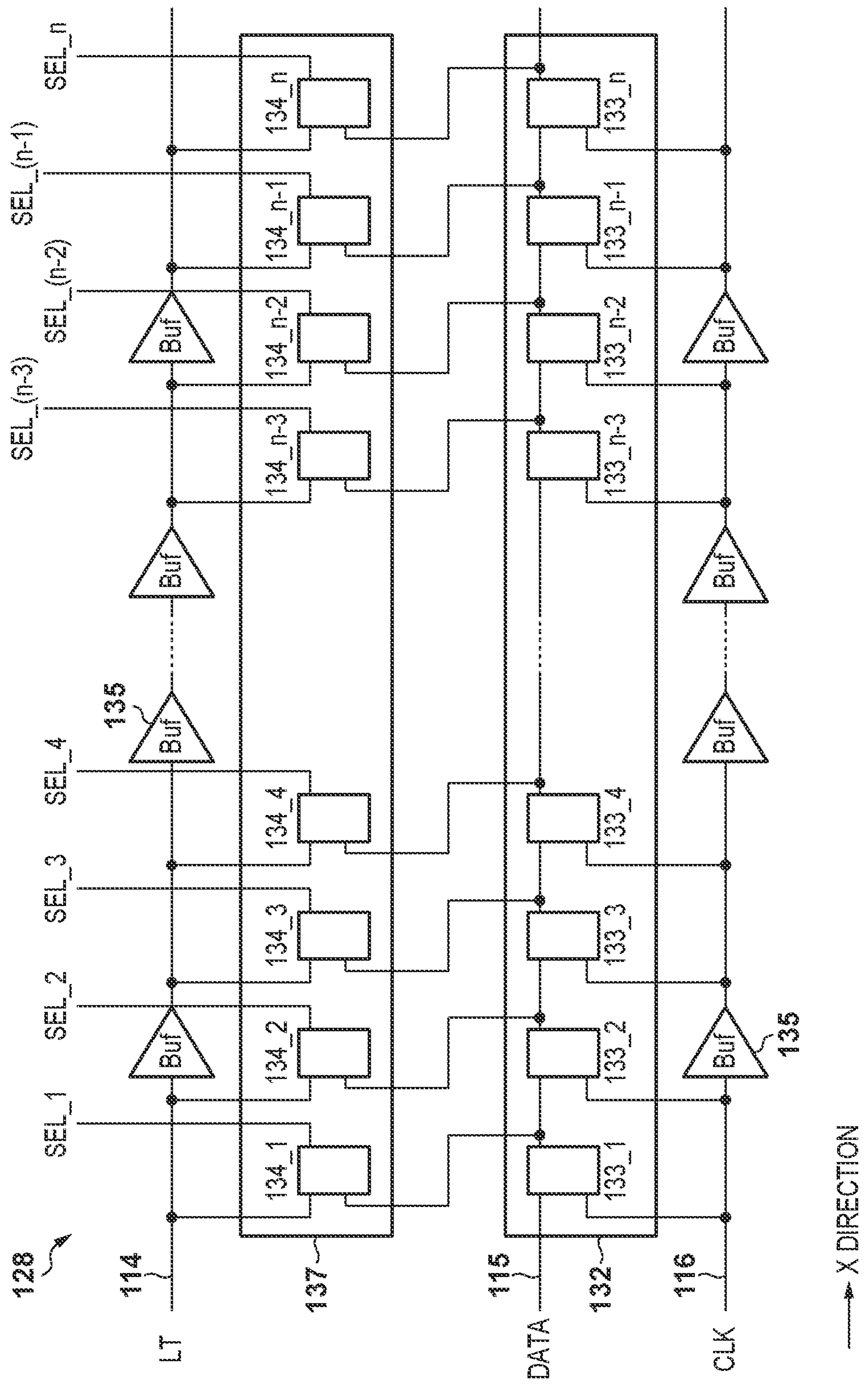
FIG. 5 is a block diagram showing an example of the arrangement of a memory circuit arranged on the liquid discharge head substrate in FIG. 1.

FIG. 5 is a circuit diagram showing the arrangement of the memory circuit 128 according to this embodiment. As described above, the memory circuit 128 is a circuit that holds drive or non-drive information of each of the liquid discharge elements 120. The memory circuit 128 can include a shift register 132 and a latch circuit group 137. The shift register 132 operates in accordance with a data signal DATA supplied via the data signal line 115 and a clock signal CLK supplied via a clock signal line 116. In this embodiment, the number of time divisions is 1, and the shift register 132 includes flip-flops 133_*m* (m is an integer of $1 \le m \le n$) having the same number of bits as that of the liquid discharge element 120. The output of the flip-flop 133_*m* is input to the flip-flop 133_*m*+1 on the next stage and is also input to a latch circuit 134_*m* functioning as a memory element of the latch circuit group 137. The latch circuit group 137 receives a memory timing signal LT via a memory timing signal line 114 and saves the output logic of the shift register 132 in accordance with the memory timing signal LT. Accordingly, a plurality of latch circuits 134 respectively correspond to the plurality of liquid discharge elements 120 and hold drive or non-drive information of the plurality of liquid discharge elements 120. The memory timing signal LT is input from the latch circuit 134_1 side to drive the latch circuit 134_1 and a latch circuit 134_2 and is transferred to the latch circuit 134_*n* side via a plurality of buffer circuits 135. In this manner, the plurality of latch circuits 134 are arranged along the X direction, and information can be written in the plurality of latch circuits 134 in the forward order in the X direction.

Figure 6:
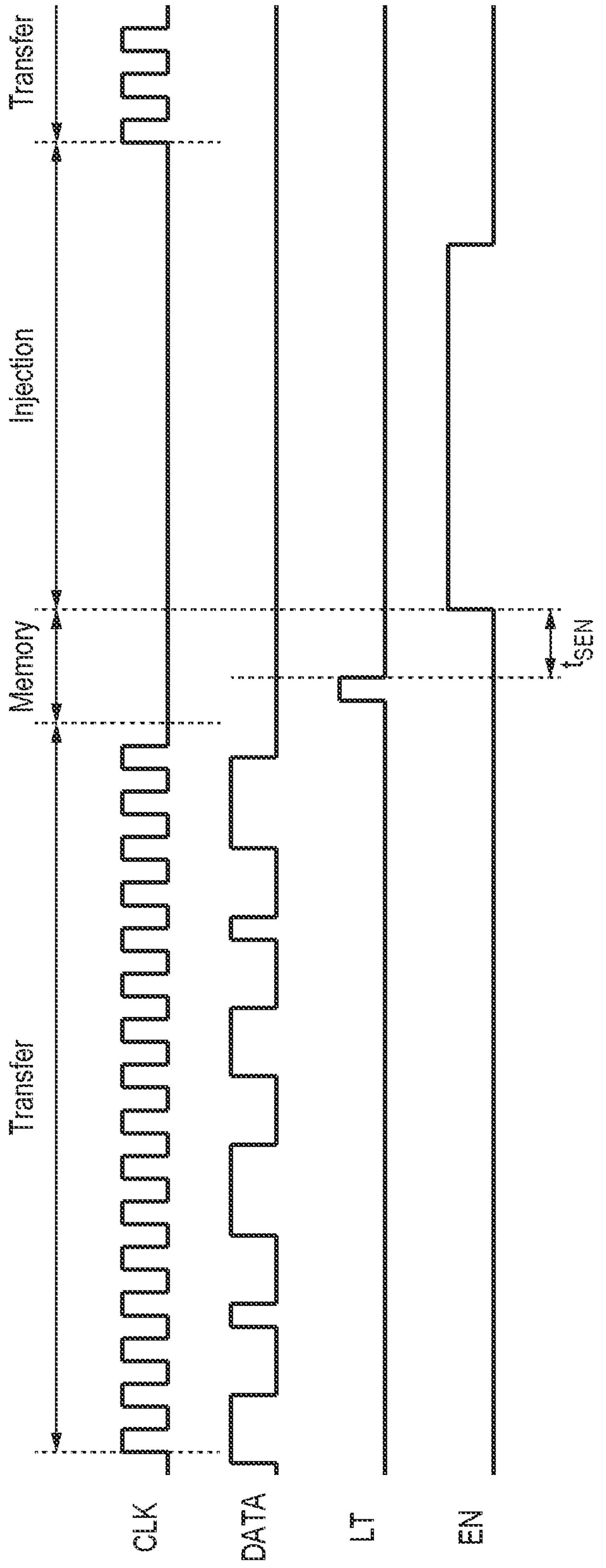
FIG. 6 is a timing chart showing the relationship among an enable signal, a memory timing signal, a data signal, and a clock signal in the liquid discharge head substrate in FIG. 1.

FIG. 6 is a timing chart showing an example of the relationship among the enable signal EN used to drive the liquid discharge head substrate 100, the memory timing signal LT, the data signal DATA, and the clock signal CLK. First of all, in the first phase, the data signal DATA and the clock signal CLK are supplied to the memory circuit 128 to transfer data to the shift register 132 in the memory circuit 128 (data "transfer" phase). In the second phase, the memory timing signal LT is supplied, and the data in the shift register 132 is saved in each latch circuit 134 of the latch circuit group 137 ("memory" phase). In the third phase, the enable signal EN is input to output the information saved in each latch circuit 134 of the latch circuit group 137 as the selection signal SEL, and each liquid discharge element 120 is driven ("discharge" phase). One-array droplet discharge is executed in these three phases as one cycle. Repeatedly executing these cycles will form a plurality of droplet arrays on a print medium. In this case, in a given cycle, the execution order of a data transfer phase, a memory phase, and a discharge phase is fixed. This is because if, for example, a memory phase and a discharge phase are interchanged, the data input in a data transfer phase before one cycle is kept saved in the memory circuit 128, and the element designated in the immediately preceding data transfer phase cannot be driven.

Figure 7:
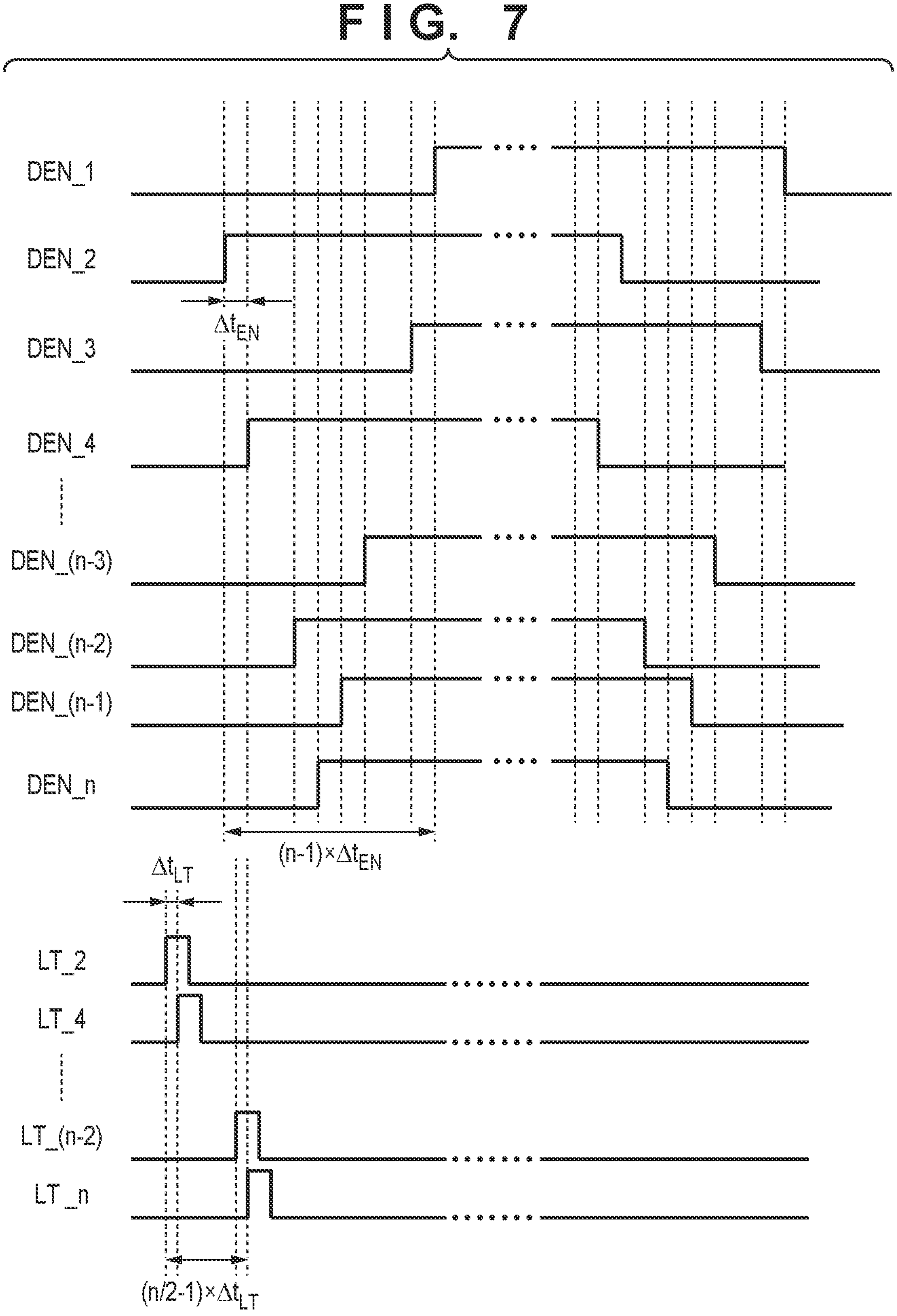
FIG. 7 is a chart for explaining the relationship between the enable signal and the memory timing signal in FIG. 6.

FIG. 7 is a timing chart comparing the delays between the delay signals DEN and the memory timing signals LT. The lower limit amount of the delay amount $\Delta t_{EN}$ of the enable signal EN in the delay buffer 131 is determined by the superimposition of noise on a logic signal as described above and is generally larger than a delay amount $\Delta t_{LT}$ of the memory timing signal LT in the buffer circuit 135. In addition, the number of stages of the delay buffers 131 is also larger than that of the buffer circuits 135.

In all the liquid discharge elements 120, a timing margin $t_{SEN}$ is set to prevent interchange between a memory phase and a discharge phase. In this embodiment, the latch circuit 134_2 corresponding to Seg. 2 at the earliest drive timing receives data at the earliest timing. That is, information is written in each of the plurality of latch circuits 134 in a predetermined order starting from the latch circuit 134, of the plurality of latch circuits 134, which corresponds to the liquid discharge element 120_2 which discharges a droplet upon being supplied first with the delay signal DEN. If the relation of $\Delta t_{EN} > \Delta t_{LT}$ holds between the delay amount $\Delta t_{EN}$ of the delay buffer 131 and the delay amount $\Delta t_{LT}$ of the buffer circuit 135, it is possible to supply the memory timing signal LT to all the liquid discharge elements 120 before the delay signal DEN.

Having this arrangement can minimize the timing margin $t_{SEN}$ to be set between the delay signal DEN and the memory timing signal LT. The discharging operation of the liquid discharge head substrate 100 is configured to include a data transfer phase, a memory phase, and a discharge phase, and hence shortening the interval between a memory phase and a discharge phase makes it possible to repeat a discharging operation at shorter intervals.

In this embodiment, the memory timing signal LT is delayed in the forward direction in the X direction. In contrast to this, the circuit 125 generates the delay signal DEN by delaying the enable signal EN in the backward direction in the X direction. The enable signal EN (delay signal DEN) is input to the circuit 125 after passing through the circuit 124, and hence the arrival order of the memory timing signal LT and the delay signal DEN is not interchanged. With this arrangement, it suffices to provide only a circuit for delaying the memory timing signal LT in one direction. This makes it possible to reduce the circuit size while preventing the interchange of the arrival order of the memory timing signal LT and the enable signal EN (the delay signal DEN).

In this embodiment, closely arranging the delay circuit 123, the transistor group 136, the control gate circuit 127, and the memory circuit 128 as elements used for controlling the same liquid discharge element 120 will provide an advantage in wiring layout. In addition, in the above embodiment, the enable signal EN is input starting from an end of the element array 129 in which the liquid discharge elements 120 are arranged. Applying this arrangement to an arrangement including external connection terminals and control logic circuits along a direction (for example, a short-side direction) crossing the X direction makes it possible to reduce the routing distance of the EN signal line 113 for supplying an enable signal.

Figure 8:
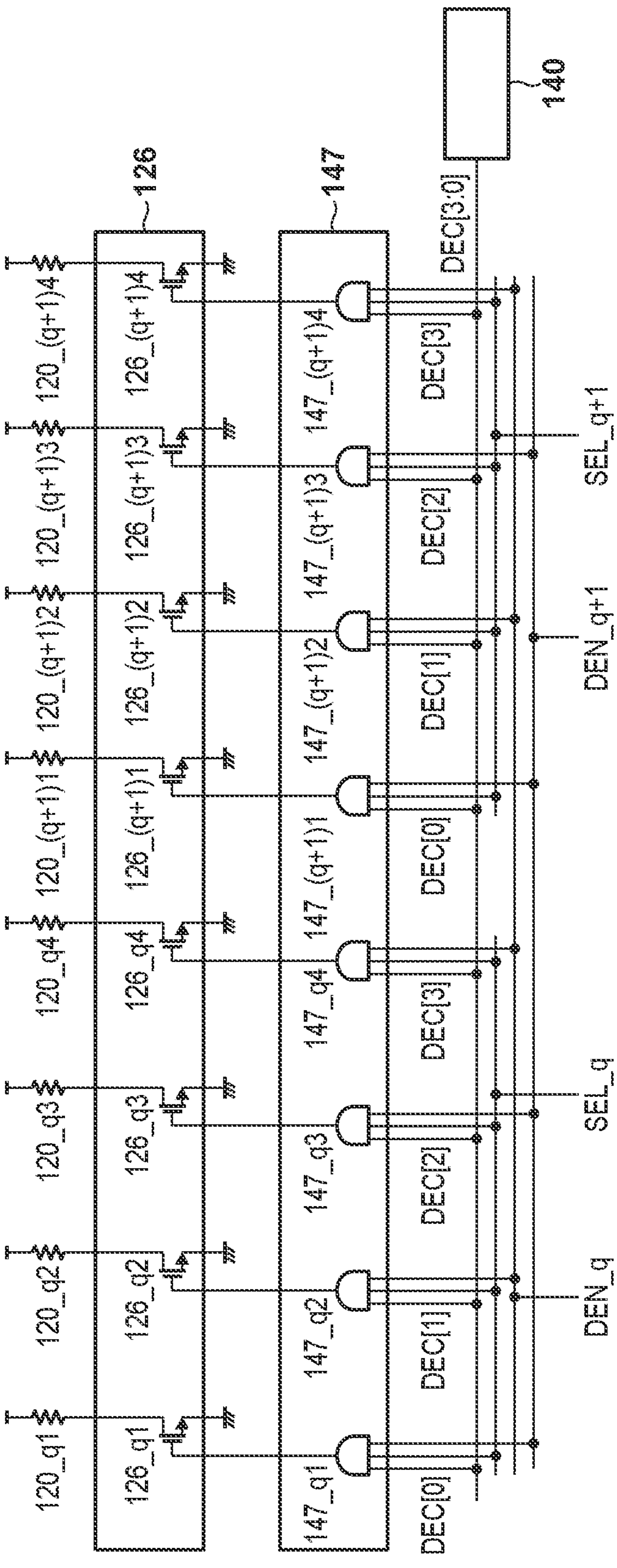
FIG. 8 is a diagram showing a modification of the liquid discharge head substrate in FIG. 1.

FIG. 8 is a circuit diagram showing a modification of the placement in FIG. 1 associated with wiring connection for the control of the liquid discharge elements 120. This modification differs from the above placement in including the plurality of liquid discharge elements 120 that operate in accordance with the same delay signals DEN.

This arrangement includes a block selection logic circuit 140 unlike the arrangement shown in FIG. 1. The block selection logic circuit 140 is a circuit for performing time-division driving upon dividing the liquid discharge elements 120 into four blocks. The block selection logic circuit 140 includes an output terminal that supplies block selection signal DEC[0] to DEC[3]. The block selection logic circuit 140 is controlled by block selection data (not shown) and is configured to inhibit the plurality of block selection signals DEC[0] to DEC[3] from being simultaneously enabled. The block selection logic circuit 140 includes, for example, a decoder and is configured to sequentially designate and drive (time-division driving) the liquid discharge elements 120 divided into a plurality of blocks for each block. A control gate circuit 147 receives the block selection signals DEC[0] to DEC[3] output from the block selection logic circuit 140. In addition, the control gate circuit 147 receives selection signals SEL_q and SEL_(q+1) and delay signals DEN_q and DEN_(q+1). The liquid discharge elements 120 include liquid discharge elements 120_*q*1 to 120_*q*4 controlled by the selection signal SEL_q and liquid discharge elements 120_(*q*+1)1 to 120_(*q*+1)4 controlled by the selection signal SEL_(q+1). This arrangement is the same as the above arrangement in that the array of the liquid discharge elements 120 in FIG. 8 corresponds to the array of the discharge ports 101 to which the respective liquid discharge elements 120 correspond.

In the control gate circuit 147, a control gate circuit 147_*st* (s is q or q+1, and t is an integer of 1≤t≤4) receives one of the block selection signals DEC in addition to any one of the delay signals DEN and any one of the selection signals SEL. The control gate circuit 147 generates a signal output to the transistor 126 and drives the transistor 126 in accordance with a combination of these logic signals.

In this case, pay attention to the delay signals DEN that control the liquid discharge elements 120. There are the liquid discharge elements 120_*qr* and 120_(*q*+1)r (r=1 or 2) controlled by the delay signals DEN_q and the liquid discharge elements 120_*qr* and 120_(*q*+1)r (r=1 or 2) controlled by the delay signals DEN_(q+1). The liquid discharge elements 120 are connected to each other such that the liquid discharge elements 120 controlled by the delay signals DEN_q and the liquid discharge elements 120 controlled by the delay signals DEN_(q+1) are alternately arranged. With this arrangement, even if the plurality of liquid discharge elements 120 are operated at the same timing by time-division driving, since the liquid discharge elements 120 to be operated at earlier drive timings and the liquid discharge elements 120 to be operated at later drive timings are alternately arranged, it can make it difficult to visually recognize differences in droplet size. In addition, as described above, the plurality of liquid discharge elements 120 controlled by the delay signals DEN_q and the plurality of liquid discharge elements 120 controlled by the delay signals DEN_(q+1) may be alternatively arranged.

In this embodiment, the delay amount $\Delta t_{EN}$ of all the delay buffers 131 is a constant value. However, this is not exhaustive. For example, in the circuits 124 and 125, the delay buffers 131 with a delay amount $\Delta t_{EN1}$ and the delay buffers 131 with a delay amount $\Delta t_{EN2}$ may be repeatedly arranged. In addition, the delay amount of the delay buffer 131 may be determined to be proportional to the number of liquid discharge elements 120 to be driven by an output from the delay buffer 131.

Figure 9:
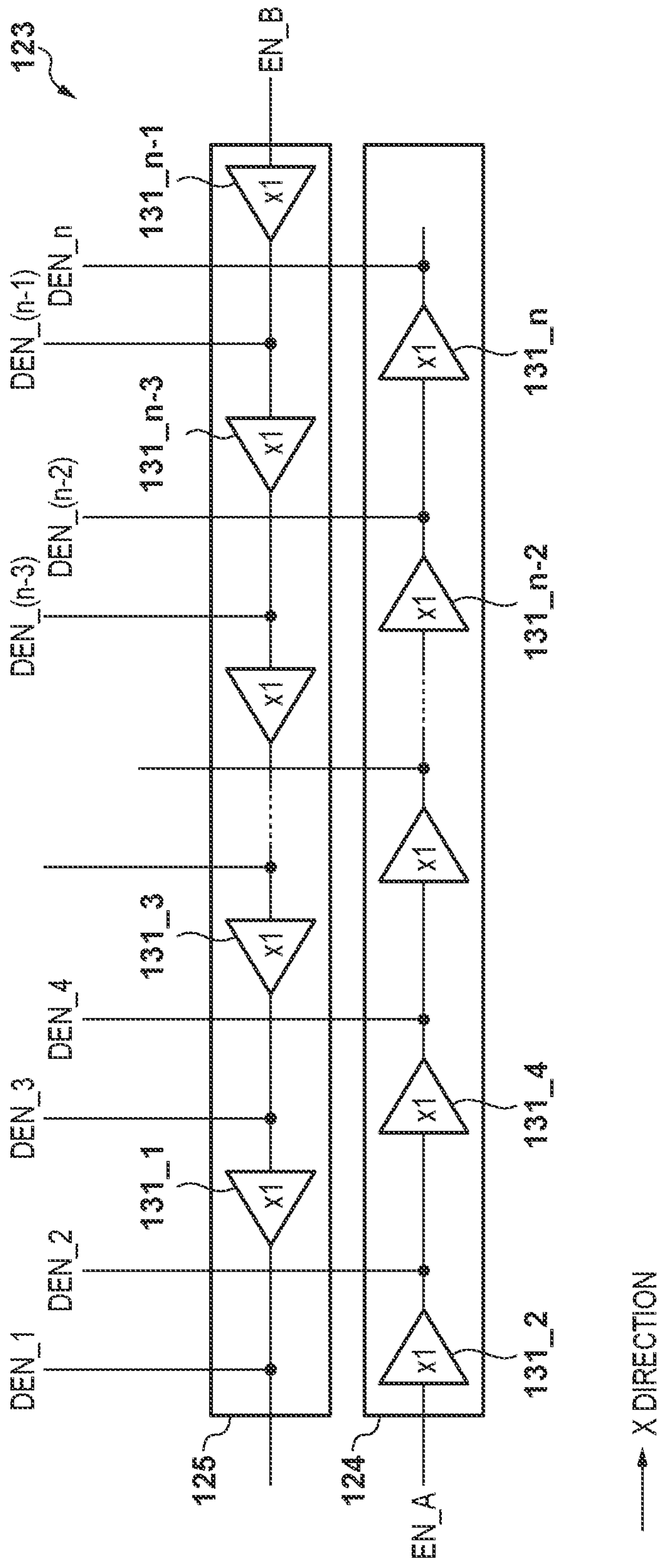
FIG. 9 is a diagram showing a modification of the delay circuit in FIG. 2.

FIG. 9 is a block diagram showing a modification of the delay circuit 123 shown in FIG. 2. In the delay circuit 123 shown in FIG. 2, the outputs of the circuit 124 including the plurality of delay buffers 131 are connected to the inputs of the circuit 125 including the plurality of delay buffers 131. In the arrangement shown in FIG. 9, in the delay circuit 123, the enable signal EN is independently supplied to the circuit 124 and the circuit 125. More specifically, as shown in FIG. 9, an enable signal EN_A is supplied as the enable signal EN to the circuit 124, and an enable signal EN_B is supplied as the enable signal EN to the circuit 125.

Figure 10:
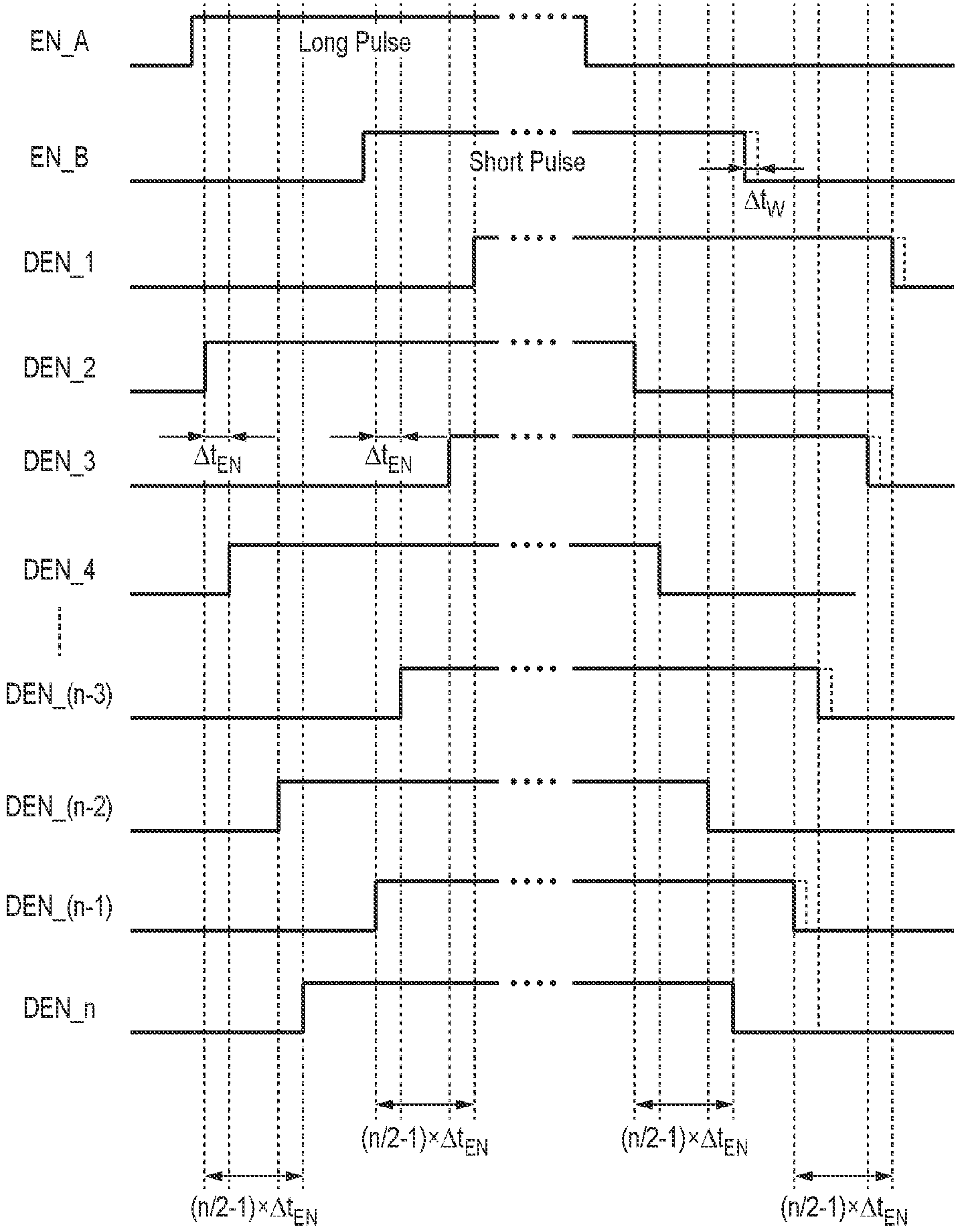
FIG. 10 is a timing chart showing the relationship among an enable signal supplied to the delay circuit in FIG. 9 and delay signals.

FIG. 10 is a timing chart showing the relationship between the enable signals EN_A and EN_B and a delay signal DEN_m (m is an integer of 1≤m≤n). The enable signal EN_A supplied to the circuit 124 is input as a pulse waveform with a period T. The enable signal EN_B supplied to the circuit 125 is input as a pulse waveform with a period $T-\Delta t_W$ shorter than the enable signal EN_A by a period $\Delta t_W$. That is, the length of the enable signal EN_A is longer than that of the enable signal EN_B. As a result, the delay signal DEN_(2*xp*) (p is an integer of 1≤p≤n/2) output from the circuit 124 is a signal with a length corresponding to the period T. The delay signal DEN_(2*xp*−1) (p is an integer of 1≤p≤n/2) output from the circuit 125 is a signal with a length corresponding to a period $T-\Delta t_W$.

The enable signal EN_B input to the circuit 125 goes high level at a timing later than the enable signal EN_A input to the circuit 124 and returns to low level after the lapse of a predetermined time. Accordingly, the liquid discharge element 120 included in the liquid discharge element group 122 controlled by the delay signal DEN_(2*xp*−1) (p is an integer of 1≤p≤n/2) obtained by delaying the enable signal EN_B is driven while the power supply voltage (the potential difference between the power line 110 and the ground line) is high for a time longer than the drive time of the liquid discharge element 120 included in the liquid discharge element group 121 controlled by the delay signal DEN_(2*xp*) (p is an integer of 1≤p≤n/2) obtained by delaying the enable signal EN_A. For this reason, the period during which the enable signal EN_B is supplied is made shorter by the period $\Delta t_W$ than the period T during which the enable signal EN_A is supplied. That is, the period during which the enable signal EN_A is supplied is longer than the period during which the enable signal EN_B is supplied. This reduces the difference between the energies generated by the liquid discharge element 120 included in the liquid discharge element group 121 and the liquid discharge element 120 included in the liquid discharge element group 122.

In this embodiment, the circuit 124 starts supplying the delay signals selected from the plurality of delay signals DEN to all the liquid discharge elements 120 included in the liquid discharge element group 121. Subsequently, the enable signals EN_A and EN_B are respectively supplied to the circuits 124 and 125 to make the circuit 125 start supplying the delay signals selected from the plurality of delay signals DEN to the liquid discharge elements 120 included in the liquid discharge element group 122.

In this embodiment, the enable signals EN_A and EN_B are respectively supplied, at different timings, to the circuits 124 and 125 arranged in the delay circuit 123 that controls the discharge states of the liquid discharge element groups 121 and 122. Accordingly, making the period during which the enable signal EN_A is supplied differ from the period during which the enable signal EN_B is supplied can make the length of the delay signal DEN generated from the enable signal EN_A differ from the length of the delay signal DEN generated from the enable signal EN_B. Accordingly, as described above, it is possible to shorten the time of the enable signal EN_B supplied to the circuit 125 that controls the liquid discharge element 120 driven at a late timing. This makes it possible to control the time during which the liquid discharge element 120 is driven with respect to the potential variation of the power line 110. In addition, it is possible to reduce the variation in droplet size.

A change in the potential of the power line 110 depends on the number of liquid discharge elements 120 simultaneously driven in the element array 129. Accordingly, a period $\Delta t_W$ as the time difference between the enable signal EN_A and the enable signal EN_B may be controlled based on the image information to be printed and the like.

As described above, the memory circuit 128 according to this embodiment may be configured to receive data first in the latch circuit 134 corresponding to the liquid discharge element 120 reaching first a driving timing. In this embodiment, the enable signal EN_A and the enable signal EN_B are independently supplied to the circuits 124 and 125 corresponding to the two different liquid discharge element groups 121 and 122. Accordingly, the memory timing signal LT may also be independently supplied in accordance with the liquid discharge elements 120 operated by the delay signals DEN generated from the enable signal EN_A and the enable signal EN_B.

According to the above description, in the arrangement shown in FIG. 9, the enable signals EN_A and EN_B are respectively supplied to the circuits 124 and 125 such that after the circuit 124 starts supplying the delay signals DEN to all the liquid discharge elements 120 included in the liquid discharge element group 121, the circuit 125 starts supplying the delay signals DEN to the liquid discharge elements 120 included in the liquid discharge element group 122. However, this is not exhaustive. For example, the enable signal EN may be supplied as commonly used enable signals EN_A and EN_B. That is, in the arrangement shown in FIG. 9, the enable signal EN may be supplied commonly to the circuit 124 and the circuit 125. Even in this case, the liquid discharge elements 120 included in the liquid discharge element group 121 that receives the delay signals DEN from the circuit 124 are sequentially driven in the forward direction in the X direction, so that the droplet size gradually increases in the forward direction in the X direction. In contrast to this, the liquid discharge elements 120 included in the liquid discharge element group 122 that receives the delay signals DEN from the circuit 125 are sequentially driven in the backward direction in the X direction, so that the droplet size gradually increases in the backward direction in the X direction. This makes it possible to improve the quality of image printing while reducing the electromagnetic noise and suppressing the influence of ringing.

In each embodiment described above, the liquid discharge elements 120, of the plurality of liquid discharge elements 120 arranged along the X direction, which are included in the liquid discharge element group 121 are sequentially driven in the forward direction in the X direction. Next, the liquid discharge elements 120, of the plurality of liquid discharge elements 120, which are included in the liquid discharge element group 122 are sequentially driven in the backward direction in the X direction. Accordingly, in the delay circuit 123 shown in FIG. 2, the enable signal EN is supplied to a delay buffer 131_2, of the delay buffers 131 arranged along the X direction in the circuit 124, which is arranged on one end (left end). In addition, in the delay circuit 123 shown in FIG. 9, the enable signals EN_A and EN_B are respectively supplied to the delay buffer 131_1 and a delay buffer 131_(n−1), of the delay buffers 131 arranged along the X direction in the circuit 124, which are respectively arranged on one end (left end) and the other end (right end). Accordingly, in the liquid discharge element group 121, the liquid discharge element 120_2, of the liquid discharge elements 120 included in the liquid discharge element group 121, which is arranged on one end is started to be driven. In the liquid discharge element group 122, the liquid discharge element 120_(n−1), of the liquid discharge elements 120 included in the liquid discharge element group 122, which is arranged on the other end is started to be driven. However, the liquid discharge head substrate 100 does not necessarily start driving the liquid discharge element 120 arranged on an end portion.

Figure 11:
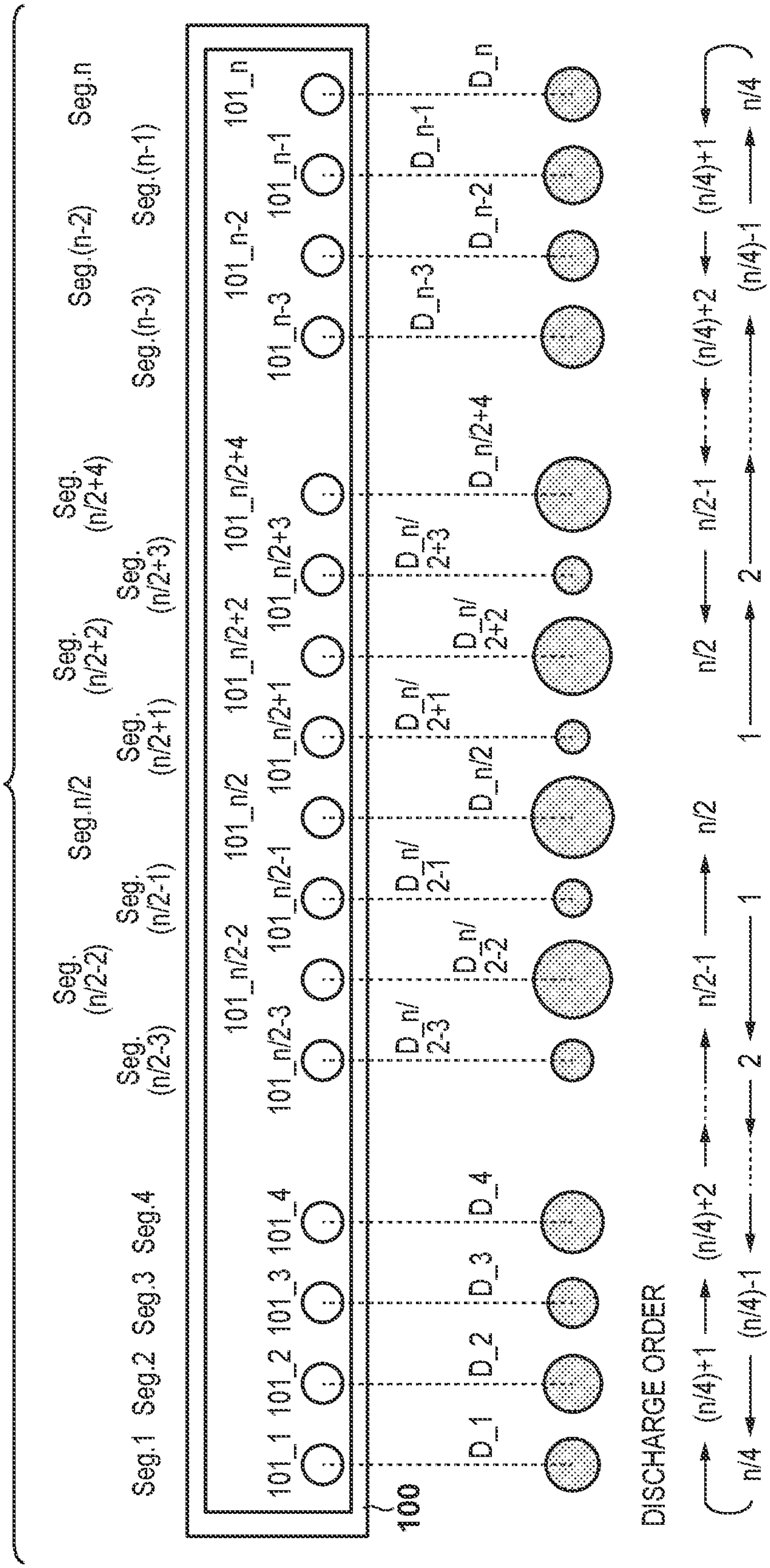
FIG. 11 is a view showing the order of discharging a liquid from the liquid discharge head substrate in FIG. 1 and the magnitude relationship among droplets.

FIG. 11 is a schematic view showing the placement of the discharge ports 101 of the liquid discharge head using the liquid discharge head substrate 100, a discharge order, and the magnitude relationship between the droplets D attached to a print medium. In the arrangement shown in FIG. 11, the discharge ports 101 are divided into two groups each including n/2 discharge ports. On one side, the droplets D are discharged in the order from SEG. (n/2+1) on the middle portion to SEG. (n/2+2) on the middle portion through SEG(n) on the right end portion. On the other side, the droplets D are discharged in the order from SEG. (n/2−1) on the middle portion to SEG. (n/2) on the middle portion through SEG. 1 on the left end portion.

Figure 12:
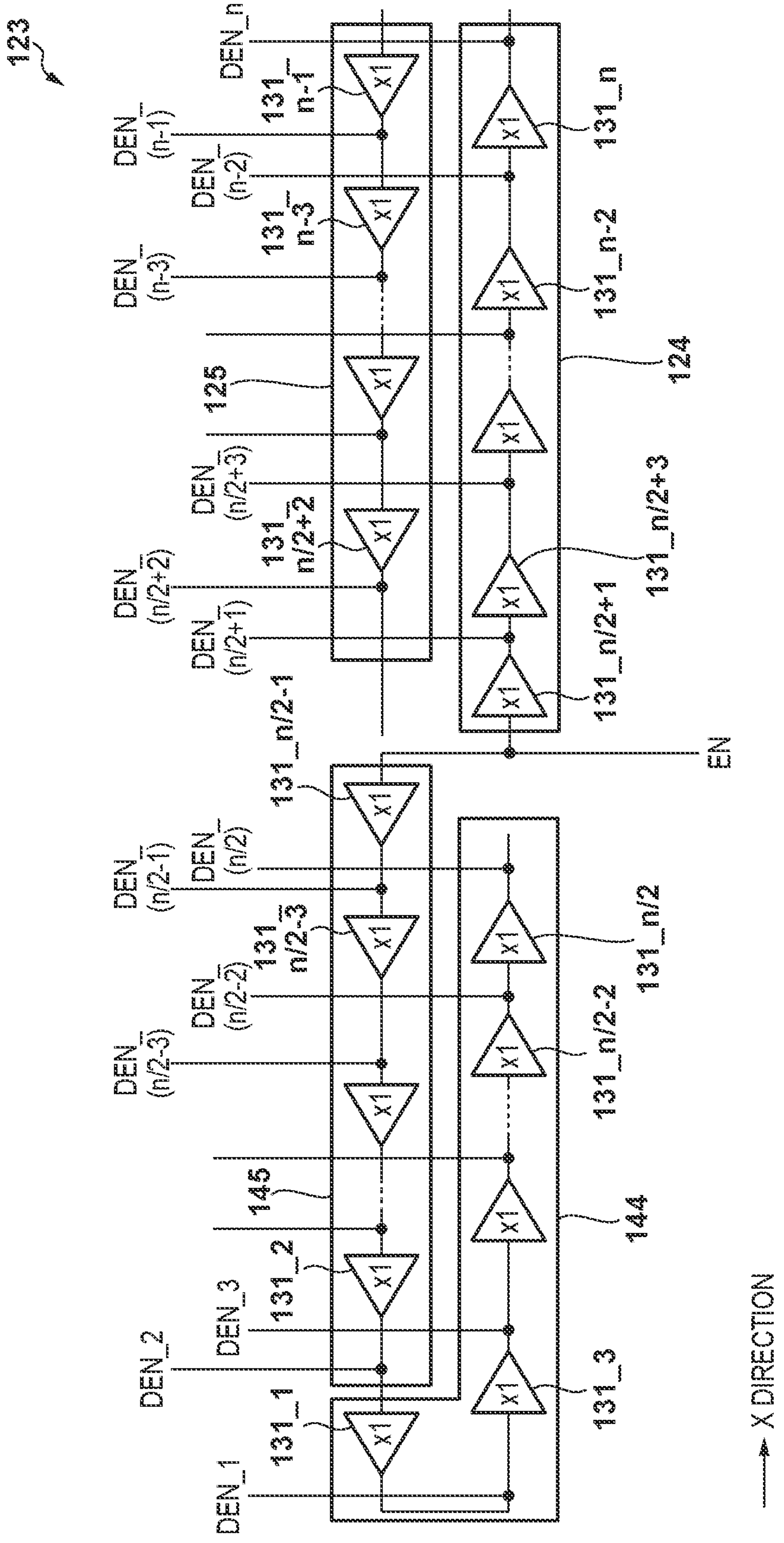
FIG. 12 is a circuit diagram showing a modification of the delay circuit in FIG. 2.

FIG. 12 is a block diagram showing an example of the arrangement of the delay circuit 123 for implementing the discharge order shown in FIG. 11. The delay circuit 123 includes circuits 144 and 145 in addition to the circuits 124 and 125. The circuit 124 starts supplying the delay signals selected from the plurality of delay signals DEN to liquid discharge elements 120_(*n*/2+1) to 120_*n* included in the liquid discharge element group 121 sequentially in the forward direction (from left to right in FIG. 12) in the X direction. The circuit 125 starts supplying the delay signals selected from the plurality of delay signals DEN to liquid discharge elements 120_(n−1) to 120_*n*(n/2+1) included in the liquid discharge element group 122 sequentially in the backward direction (from right to left in FIG. 12) in the X direction. The circuit 144 starts supplying the delay signals selected from the plurality of delay signals DEN to liquid discharge elements 120_1 to 120_(*n*/2) included in a liquid discharge element group different from the liquid discharge element groups 121 and 122 sequentially in the forward direction in the X direction. The circuit 145 starts supplying the delay signals selected from the plurality of delay signals DEN to liquid discharge elements 120_(*n*/2−1) to 120_2 included in a liquid discharge element group different from the liquid discharge element groups 121 and 122 and the liquid discharge element group to which the delay signals DEN are supplied from the circuit 144 sequentially in the backward direction in the X direction.

As described above, in the element array 129 in which the plurality of liquid discharge elements 120 are arranged, one or more liquid discharge elements of the liquid discharge elements 120 included in the liquid discharge element group to which the delay signals DEN are supplied from the circuit 144 and one or more liquid discharge elements of the liquid discharge elements 120 included in the liquid discharge element group to which the delay signals DEN are supplied from the circuit 145 are alternately arranged. As shown in FIG. 12, the element array 129 in which the plurality of liquid discharge elements 120 are arranged is divided from the middle of the element array 129 as a boundary into a portion in which the liquid discharge element group 121 to which the delay signals DEN are supplied from the circuit 124 and the liquid discharge element group 122 to which the delay signals DEN are supplied from the circuit 125 are arranged and a portion in which the liquid discharge element group to which the delay signals DEN are supplied from the circuit 144 and the liquid discharge element group to which the delay signals DEN are supplied from the circuit 145 are arranged. In this case, the middle of the element array 129 includes the center of the element array 129 from which the plurality of liquid discharge elements 120 arranged in the element array 129 are divided into two groups in the X direction. For example, the middle of the element array 129 may be a range in which the 10 liquid discharge elements 120 are arranged from the center of the element array 129 in the forward and backward directions in the X direction. Alternatively, for example, the middle of the element array 129 may be a range in which the 50 liquid discharge elements 120 are arranged from the center of the element array 129 in the forward and backward directions in the X direction.

The circuits 144 and 145 each can include a plurality of buffer circuits (delay buffers 131) like the circuits 124 and 125. In this case, in the delay circuit 123, the circuit 145 and the circuit 144 may be connected in series similarly to the relationship between the circuit 124 and the circuit 125 shown in FIG. 2. More specifically, the output of the last-stage delay buffer 131_2 of the plurality of delay buffers 131 arranged in the circuit 145 may be input to the circuit 144. In the arrangement shown in FIG. 12, the enable signal EN is supplied commonly to the circuit 124 and the circuit 145. When the enable signal EN is supplied to the circuit 145, the circuit 145 starts supplying the delay signals selected from the plurality of delay signals DEN to all the liquid discharge elements 120 included in the liquid discharge element group to which the delay signals DEN are supplied from the circuit 145 similarly to the relationship between the circuits 124 and 125 shown in FIG. 2. The circuit 144 then starts supplying the delay signals selected from the plurality of delay signals DEN to the liquid discharge elements 120 included in the liquid discharge element group to which the delay signals DEN are supplied from the circuit 144.

The arrangement according to this embodiment makes it possible to input the enable signal EN to the delay circuit 123 that controls the liquid discharge element 120 at the middle portion of the liquid discharge head substrate 100. As described above, closely arranging elements included in the delay circuit 123, the transistor group 136, the control gate circuit 127, and the memory circuit 128 which are used for controlling the same liquid discharge element 120 will provide an advantage in wiring layout. In the embodiment shown in FIGS. 11 and 12, the enable signal EN is supplied from the middle of the element array 129 in which the liquid discharge elements 120 are arranged. Applying the arrangement according to the embodiment to the arrangement including external connection terminals and control logic circuits can reduce the routing distance of the EN signal line 113 for supplying an enable signal.

The memory circuit 128 according to this embodiment may be configured to receive data first in the latch circuit 134 corresponding to the liquid discharge element 120 reaching first a driving timing. In the arrangement shown in FIGS. 11 and 12, the liquid discharge elements 120_(*n*/2+1) and 120_(*n*/2−1) (arranged in correspondence with the discharge ports 101_(*n*/2+1) and 101_(*n*/2−1) in FIG. 11), of the liquid discharge elements 120 driven by the circuits 124 and 145, which are driven at the earliest timing are arranged at near positions on the liquid discharge head substrate 100. Accordingly, the memory circuit 128 may be configured to drive the latch circuits 134 corresponding to the two liquid discharge elements 120 by using the memory timing signal LT delayed by the buffer circuit 135.

Figure 13:
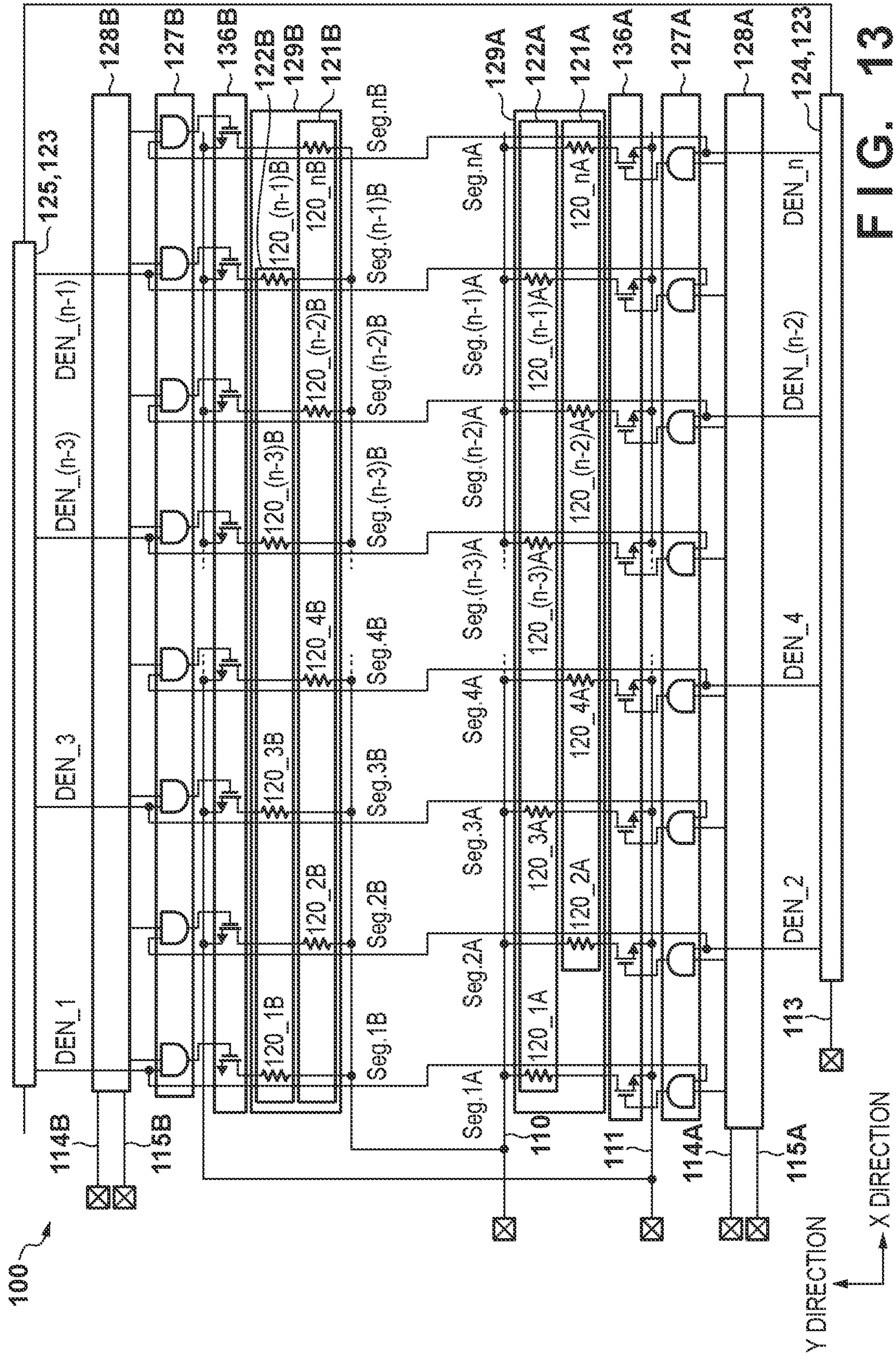
FIG. 13 is a circuit diagram showing a modification of the liquid discharge head substrate in FIG. 1.

FIG. 13 is a circuit diagram showing a modification of the arrangement of the liquid discharge head substrate 100 shown in FIG. 1. The arrangement shown in FIG. 13 differs from the arrangement shown in FIG. 1 in that a plurality of liquid discharge elements 120A constituting an element array 129A along the X direction and a plurality of liquid discharge elements 120B constituting an element array 129B along the X direction are arranged. The plurality of liquid discharge elements 120A include liquid discharge elements included in a liquid discharge element group 121A and liquid discharge elements included in a liquid discharge element group 122A. Likewise, the plurality of liquid discharge elements 120B include liquid discharge elements included in a liquid discharge element group 121B and liquid discharge elements included in a liquid discharge element group 122B. The liquid discharge element groups 121A and 121B share the circuit 124 of the delay circuit 123, and the liquid discharge element groups 122A and 122B share the circuit 125 of the delay circuit 123. In other words, the plurality of liquid discharge elements 120B include the liquid discharge elements included in the liquid discharge element group 121B sharing the delay signals, of the plurality of delay signals DEN, which are supplied from the circuit 124 to the liquid discharge element group 121A and the liquid discharge elements included in the liquid discharge element group 122B different from the liquid discharge element group 121B sharing the delay signals, of the plurality of delay signals DEN, which are supplied from the circuit 125 to the liquid discharge element group 122A.

In addition, the element array 129A and the element array 129B share the power line 110 and the ground line 111. On the other hand, the element arrays 129A and 129B are respectively provided with transistor groups 136A and 136B, control gates 127A and 127B, and memory circuits

128A and 128B. The circuits 124 and 125 of the delay circuit 123 each can be similar to the arrangement shown in FIG. 1. In correspondence with each of the element arrays 129A and 129B, the transistor groups 136A and 136B, the control gate circuits 127A and 127B, and the memory circuits 128A and 128B each can have an arrangement similar to that of a corresponding one of the transistor group 136, the control gate circuit 127, and the memory circuit 128 shown in FIG. 1.

The circuit 124 of the delay circuit 123 is arranged, in the Y direction crossing the X direction, on the side of the liquid discharge head substrate 100 shown in FIG. 13 on which the element array 129A is arranged. The circuit 125 of the delay circuit 123 is arranged, in the Y direction, on the side on which the element array 129B is arranged. The delay signals DEN_(2*xp*) (p is an integer of 1≤p≤n/2) output from the circuit 124 are supplied to the liquid discharge elements, of the liquid discharge elements 120A arranged in the element array 129A, which are included in the liquid discharge element group 121A and the liquid discharge elements, of the liquid discharge elements 120B arranged in the element array 129B, which are included in the liquid discharge element group 121B. The delay signals DEN_(2*xp*−1) (p is an integer of 1≤p≤n/2) output from the circuit 125 are supplied to the liquid discharge elements, of the liquid discharge elements 120A arranged in the element array 129A, which are included in the liquid discharge element group 122A and the liquid discharge elements, of the liquid discharge elements 120B arranged in the element array 129B, which are included in the liquid discharge element group 122B.

The arrays of the liquid discharge elements 120A included in the liquid discharge element group 121A and the liquid discharge elements 120A included in the liquid discharge element group 122A may be similar to those of the liquid discharge elements 120 included in the liquid discharge element group 121 described above and the liquid discharge elements 120 included in the liquid discharge element group 122 described above. That is, the liquid discharge elements 120A included in the liquid discharge element group 121A and the liquid discharge elements 120A included in the liquid discharge element group 122A may be alternately arranged. Alternatively, one or more liquid discharge elements 120A included in the liquid discharge element group 121A and one or more liquid discharge elements 120A included in the liquid discharge element group 122A may be alternately arranged. In addition, referring to FIG. 13, the liquid discharge elements 120A included in the liquid discharge element group 121A and the liquid discharge elements 120A included in the liquid discharge element group 122A are drawn shifted from each other in the Y direction. However, these liquid discharge elements can be arranged without being shifted in the Y direction. The same applies to the placement relationship between the liquid discharge elements 120B included in the liquid discharge element group 121B and the liquid discharge elements 120B included in the liquid discharge element group 122B.

In this embodiment, the circuit 124 of the delay circuit 123 is shared by the liquid discharge element groups 121A and 121B, and the circuit 125 of the delay circuit 123 is shared by the liquid discharge element groups 122A and 122B. This makes it possible to reduce by half the area of the delay circuit 123 arranged near the liquid discharge element groups 121A, 121B, 122A, and 122B. This arrangement can be advantageously applied to, for example, an arrangement in which the plurality of element arrays 129 are arranged apart from each other in the Y direction crossing the X direction, and each element array 129 performs liquid discharge corresponding to one array.

OTHER EMBODIMENTS

Figure 14A:
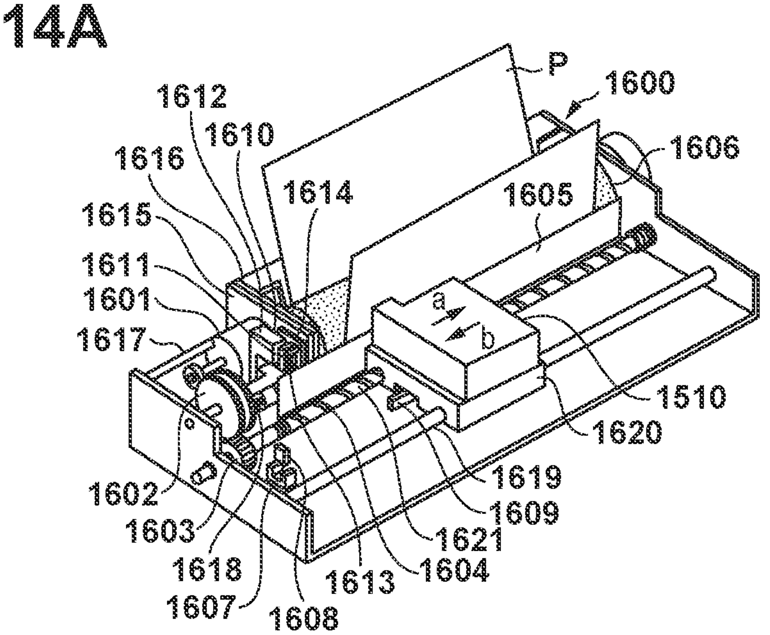
FIGS. 14A to 14D are views showing an example of the arrangement of a liquid discharge apparatus using the liquid discharge head substrate in FIG. 1.

A liquid discharge apparatus using the above-described liquid discharge head substrate 100 will be explained with reference to FIGS. 14A to 14D. FIG. 14A exemplifies the internal arrangement of a liquid discharge apparatus 1600 typified by an inkjet printer, a facsimile apparatus, or a copying machine. In this example, the liquid discharge apparatus may also be called a printing apparatus. The liquid discharge apparatus 1600 includes a liquid discharge head 1510 that discharges a liquid (in this example, ink or a printing material) to a predetermined medium P (in this example, a printing medium such as paper). In this example, the liquid discharge head may also be called a printhead. The liquid discharge head 1510 is mounted on a carriage 1620, and the carriage 1620 can be attached to a lead screw 1621 having a helical groove 1604. The lead screw 1621 can rotate in synchronization with rotation of a driving motor 1601 via driving force transmission gears 1602 and 1603. The liquid discharge head 1510 can move in a direction indicated by an arrow a or b along a guide 1619 together with the carriage 1620.

The medium P is pressed by a paper press plate 1605 in the carriage moving direction and fixed to a platen 1606. The liquid discharge apparatus 1600 performs liquid discharge (in this example, printing) to the medium P conveyed on the platen 1606 by a conveyance unit (not shown) by reciprocating the liquid discharge head 1510.

The liquid discharge apparatus 1600 confirms the position of a lever 1609 provided on the carriage 1620 via photocouplers 1607 and 1608, and switches the rotational direction of the driving motor 1601. A support member 1610 supports a cap member 1611 for covering the nozzle (liquid orifice or simply orifice) of the liquid discharge head 1510. A suction portion 1612 performs recovery processing of the liquid discharge head 1510 by sucking the interior of the cap member 1611 via an intra-cap opening 1613. A lever 1617 is provided to start recovery processing by suction, and moves along with movement of a cam 1618 engaged with the carriage 1620. A driving force from the driving motor 1601 is controlled by a well-known transmission mechanism such as a clutch switch.

A main body support plate 1616 supports a moving member 1615 and a cleaning blade 1614. The moving member 1615 moves the cleaning blade 1614 to perform recovery processing of the liquid discharge head 1510 by wiping. The liquid discharge apparatus 1600 includes a controller (not shown) and the controller controls driving of each mechanism described above.

Figure 14B:
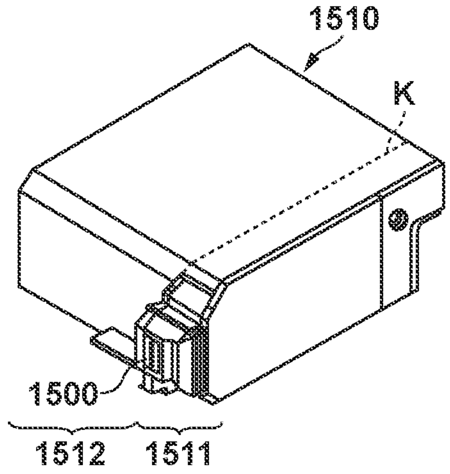

FIG. 14B exemplifies the outer appearance of the liquid discharge head 1510. The liquid discharge head 1510 can include a head portion 1511 having a plurality of nozzles 1500, and a tank (liquid storage portion) 1512 that holds a liquid to be supplied to the head portion 1511. The tank 1512 and the head portion 1511 can be separated at, for example, a broken line K and the tank 1512 is interchangeable. The liquid discharge head 1510 has an electrical contact (not shown) for receiving an electrical signal from the carriage 1620 and discharges a liquid in accordance with the electrical signal. The tank 1512 has a fibrous or porous liquid holding member (not shown) and the liquid holding member can hold a liquid.

Figure 14C:
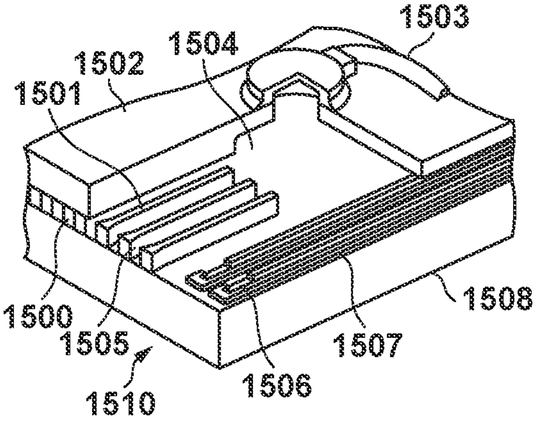

FIG. 14C exemplifies the internal arrangement of the liquid discharge head 1510. The liquid discharge head 1510 includes a base 1508, flow path wall members 1501 that are arranged on the base 1508 and form flow paths 1505, and a top plate 1502 having a liquid supply path 1503. The base 1508 may be the above-described liquid discharge head substrate 100. As discharge elements or liquid discharge elements (corresponding to the liquid discharge elements 120 described above), heaters 1506 (which can also be referred to as electrothermal transducers or heat generating resistive elements) are arrayed on the substrate (liquid discharge head substrate) of the liquid discharge head 1510 in correspondence with the respective nozzles 1500. Each heater 1506 is driven to generate heat by turning on a driving element (switching element such as a transistor) provided in correspondence with the heater 1506.

A liquid from the liquid supply path 1503 is stored in a common liquid chamber 1504 and supplied to each nozzle 1500 via the corresponding flow path 1505. The liquid supplied to each nozzle 1500 is discharged from the nozzle 1500 in response to driving of the heater 1506 corresponding to the nozzle 1500.

Figure 14D:
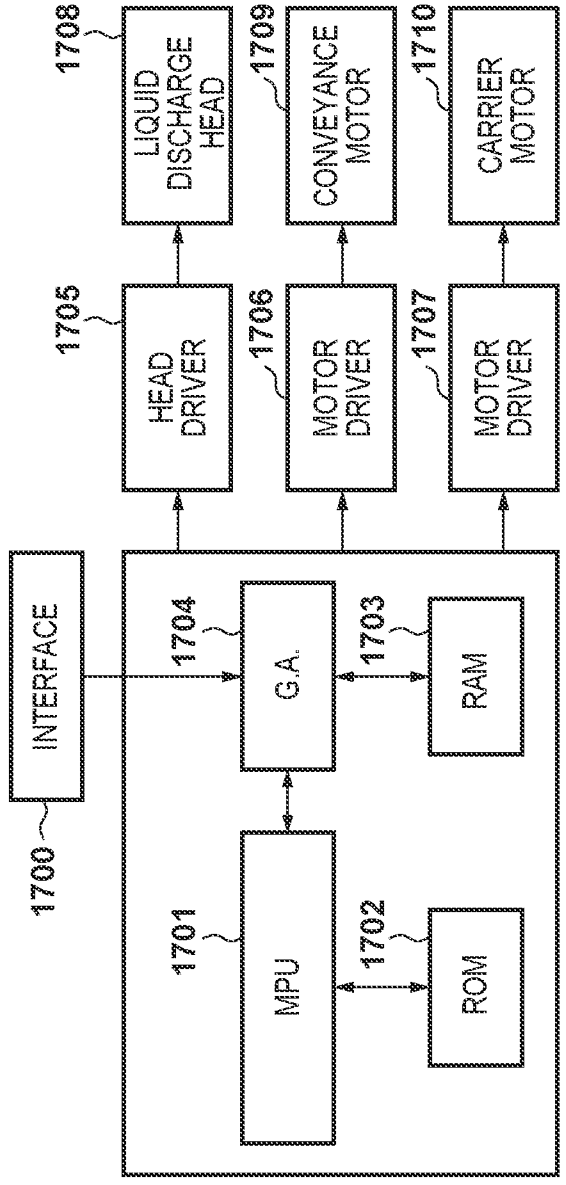

FIG. 14D exemplifies the system arrangement of the liquid discharge apparatus 1600. The liquid discharge apparatus 1600 includes an interface 1700, a MPU 1701, a ROM 1702, a RAM 1703, and a gate array (G.A.) 1704. The interface 1700 receives from the outside an external signal for executing liquid discharge. The ROM 1702 stores a control program to be executed by the MPU 1701. The RAM 1703 saves various signals and data such as the above-mentioned external signal for liquid discharge and data supplied to the liquid discharge head 1708. The gate array 1704 performs supply control of data to the liquid discharge head 1708 and control of data transfer between the interface 1700, the MPU 1701, and the RAM 1703.

The liquid discharge apparatus 1600 further includes a head driver 1705, motor drivers 1706 and 1707, a conveyance motor 1709, and a carrier motor 1710. The carrier motor 1710 conveys a liquid discharge head 1708. The conveyance motor 1709 conveys the medium P. The head driver 1705 drives the liquid discharge head 1708. The motor drivers 1706 and 1707 drive the conveyance motor 1709 and the carrier motor 1710, respectively.

When a driving signal is input to the interface 1700, it can be converted into data for liquid discharge between the gate array 1704 and the MPU 1701. Each mechanism performs a desired operation in accordance with this data. In this manner, the liquid discharge head 1708 is driven.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-038978, filed Mar. 13, 2023, which is hereby incorporated by reference herein in its entirety.

What is claimed is:

1. A liquid discharge head substrate comprising:

a plurality of liquid discharge elements constituting an element array along a first direction; and a delay circuit configured to generate a plurality of delay signals obtained by delaying an enable signal for driving the plurality of liquid discharge elements by different delay amounts, wherein the delay circuit includes a first circuit configured to start supplying delay signals selected from the plurality of delay signals to liquid discharge elements, of the plurality of liquid discharge elements, which are included in a first liquid discharge element group sequentially in a forward direction in the first direction and a second circuit configured to start supplying delay signals selected from the plurality of delay signals to liquid discharge elements, of the plurality of liquid discharge elements, which are included in a second liquid discharge element group different from the first liquid discharge element group sequentially in a backward direction in the first direction, in the element array, not less than one liquid discharge element of liquid discharge elements included in the first liquid discharge element group and not less than one liquid discharge element of liquid discharge elements included in the second liquid discharge element group are alternately arranged, and the first circuit and the second circuit are connected in series in the delay circuit.

2. The substrate according to claim 1, wherein the first circuit starts supplying delay signals selected from the plurality of delay signals to all liquid discharge elements included in the first liquid discharge element group, and the second circuit then starts supplying delay signals selected from the plurality of delay signals to liquid discharge elements included in the second liquid discharge element group.

3. The substrate according to claim 1, wherein the first circuit and the second circuit each include a plurality of buffer circuits, and the plurality of buffer circuits respectively supply outputs to corresponding liquid discharge elements of the plurality of liquid discharge elements.

4. The substrate according to claim 3, wherein an output of a last-stage buffer circuit of the plurality of buffer circuits of the first circuit is input to the second circuit.

5. The substrate according to claim 1, further comprising a plurality of memory elements respectively corresponding to the plurality of liquid discharge elements and configured to hold drive or non-drive information of the plurality of liquid discharge elements, wherein the plurality of liquid discharge elements include a first liquid discharge element to which a first delay signal of the plurality of delay signals is supplied, and the information is written in each of the plurality of memory elements in a predetermined order starting from a memory element, of the plurality of memory elements, which corresponds to the first liquid discharge element.

6. The substrate according to claim 5, wherein the plurality of memory elements are arranged along the first direction, and the information is written in the plurality of memory elements sequentially in the forward direction.

7. The substrate according to claim 5, wherein the enable signal is commonly supplied to the first circuit and the second circuit.

8. The substrate according to claim 1, wherein the delay circuit includes a third circuit configured to start supplying delay signals selected from the plurality of delay signals, sequentially in the forward direction, to liquid discharge elements, of the plurality of liquid discharge elements, which are included in a third liquid discharge element group different from the first liquid discharge element group and the second liquid discharge element group and a fourth circuit configured to start supplying delay signals selected from the plurality of delay signals, sequentially in the backward direction, to liquid discharge elements, of the plurality of liquid discharge elements, which are included in a fourth liquid discharge element group different from the first liquid discharge element group, the second liquid discharge element group, and the third liquid discharge element group, and not less than one liquid discharge element of liquid discharge elements included in the third liquid discharge element group and not less than one liquid discharge element of liquid discharge elements included in the fourth liquid discharge element group are alternately arranged in the element array.

9. The substrate according to claim 8, wherein the element array is divided from a middle of the element array as a boundary into a portion in which the first liquid discharge element group and the second liquid discharge element group are arranged and a portion in which the third liquid discharge element group and the fourth liquid discharge element group are arranged.

10. The substrate according to claim 8, wherein the enable signal is commonly supplied to the first circuit and the fourth circuit.

11. The substrate according to claim 10, wherein the fourth circuit starts supplying delay signals selected from the plurality of delay signals to all liquid discharge elements included in the fourth liquid discharge element group, and the third circuit then starts supplying delay signals selected from the plurality of delay signals to liquid discharge elements included in the third liquid discharge element group.

12. The substrate according to claim 10, wherein in the delay circuit, the third circuit and the fourth circuit are connected in series.

13. The substrate according to claim 10, wherein the third circuit and the fourth circuit each include a plurality of buffer circuits, the plurality of buffer circuits of the third circuit and the fourth circuit have outputs to which corresponding liquid discharge elements of the plurality of liquid discharge elements are connected, and an output of a last-stage buffer circuit of the plurality of buffer circuits of the fourth circuit is input to the third circuit.

14. The substrate according to claim 1, further comprising a second plurality of liquid discharge elements constituting a second element array along the first direction, with the element array being a first element array and the plurality of liquid discharge elements being a first plurality of liquid discharge elements, wherein the second plurality of liquid discharge elements include a liquid discharge element included in a fifth liquid discharge element group sharing a delay signal, of the plurality of delay signals, which is supplied from the first circuit to the first liquid discharge element group and a liquid discharge element included in a sixth liquid discharge element group different from the fifth liquid discharge element group sharing a delay signal, of the plurality of delay signals, which is supplied from the second circuit to the second liquid discharge element group.

15. The substrate according to claim 14, wherein in the second element array, not less than one liquid discharge element of liquid discharge elements included in the fifth liquid discharge element group and not less than one liquid discharge element of liquid discharge elements included in the sixth liquid discharge element group are alternately arranged.

16. The substrate according to claim 1, wherein the plurality of liquid discharge elements each are arranged between a common power line and a ground line.

17. A liquid discharge head comprising:

the liquid discharge head substrate according to claim 1; and a discharge port from which discharge of a liquid is controlled by the liquid discharge head substrate.

18. A liquid discharge apparatus comprising:

the liquid discharge head according to claim 17; and a unit configured to supply a driving signal for making the liquid discharge head discharge a liquid.

* * * * *